(12) United States Patent
Ohtake et al.

(10) Patent No.: US 7,742,231 B2
(45) Date of Patent: Jun. 22, 2010

(54) ZOOM LENS AND IMAGING APPARATUS

(75) Inventors: Motoyuki Ohtake, Saitama (JP); Ken Tanaka, Tokyo (JP); Tsutomu Naitou, Kanagawa (JP); Takuya Tsutsumi, Tokyo (JP); Eiji Yano, Tokyo (JP); Tatsuyuki Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 569 days.

(21) Appl. No.: 11/808,636

(22) Filed: Jun. 12, 2007

(65) Prior Publication Data

US 2007/0291375 A1 Dec. 20, 2007

(30) Foreign Application Priority Data

Jun. 15, 2006 (JP) ............................. 2006-166428

(51) Int. Cl.
*G02B 27/64* (2006.01)

(52) U.S. Cl. ..................... 359/557; 359/676; 359/684

(58) Field of Classification Search ................ 359/557, 359/676, 684, 685, 687, 554

See application file for complete search history.

(56) References Cited

U.S. PATENT DOCUMENTS 7,411,731 B2 * 8/2008 Ohtake et al. ............... 359/557

FOREIGN PATENT DOCUMENTS

| JP | 62-153816 | 7/1987 |
| JP | 02-168223 | 6/1990 |
| JP | 06-337353 A1 | 12/1994 |
| JP | 10-246855 | 9/1998 |
| JP | 11-044845 | 2/1999 |

* cited by examiner

*Primary Examiner*—Joshua L Pritchett
(74) *Attorney, Agent, or Firm*—Rader, Fishman & Grauer PLLC

(57) ABSTRACT

A zoom lens includes: a front group including a plurality of movable lens groups; and a rear group that is provided on an image side of the front group and that includes a negative lens and a positive lens. The positive lens has a flat lens surface on its image side, and is tiltable about a spherical center of its object side lens surface that is convex on the object side. When a lens system is inclined, the positive lens is tilted in relation to the optical axis of the lens system based on: a focal length of the overall lens system; an angle of the optical axis of the lens system after being inclined in relation to the optical axis before being inclined; a distance between the image side lens surface of the positive lens and the image plane; and a refractive index of the positive lens.

6 Claims, 20 Drawing Sheets

TRANSVERSE ABERRATION

TRANSVERSE ABERRATION

TRANSVERSE
ABERRATION

TRANSVERSE
ABERRATION

TRANSVERSE ABERRATION

TRANSVERSE ABERRATION

FIG. 23
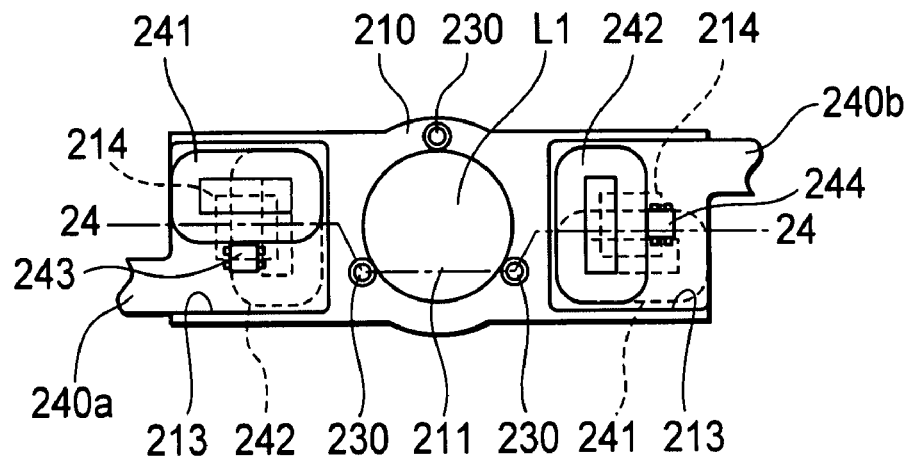
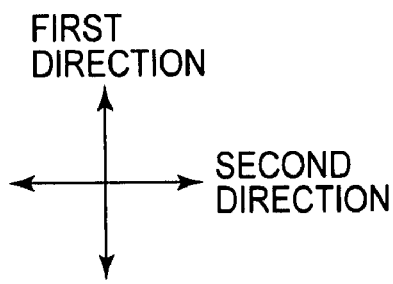
FIG. 24
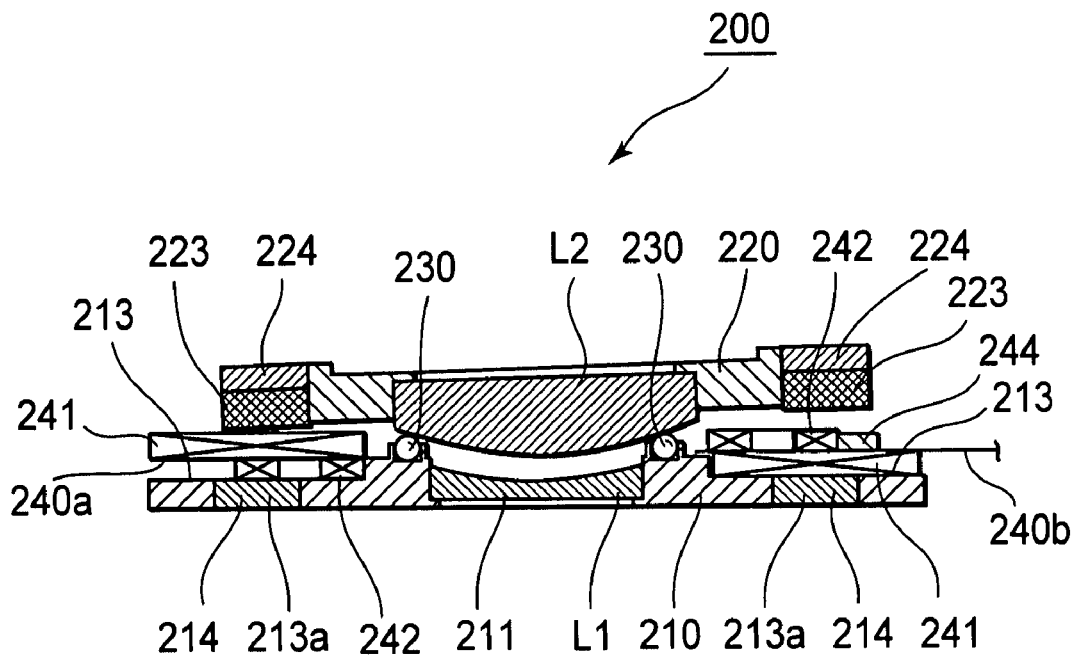

ZOOM LENS AND IMAGING APPARATUS

BACKGROUND OF THE INVENTION

1. Field of the Invention

The present invention relates to a zoom lens and imaging apparatus. More specifically, with respect to a zoom lens that is capable of image shifting, the present invention relates to a technology that makes it possible to reduce the lens diameter, and that suppresses fluctuations in various aberrations that occur during image shifting.

2. Description of Related Art

With a zoom lens that has a large zoom ratio, because the angle of field becomes narrow in the maximum telephoto state, there is an issue in that even the smallest hand movement or camera shake causes a significant blurring of the image.

As methods of image stabilization that correct for the blurring of images caused by such hand movements or the like, optical image stabilization systems are known.

With an optical image stabilization system, by combining a detection system that detects movements of the camera that accompany hand movements that result from shutter release, a control system that instructs a displacement to a drive system based on a signal outputted from the detection system, the drive system that drives an optical system based on an output from the control system, and the optical system that is capable of image shifting when a displacement is instructed by the drive system, it is possible to correct for the blurring of the image caused by movements of the camera by canceling it out with the blurring of the image that accompanies the displacement of the optical system.

For the optical system used in such optical image stabilization systems, such methods as the lens shift method where a portion of the lens system is moved in a direction that is perpendicular to the optical axis, or the variable angle prism method where the angle of the prism located right before the lens system is varied.

In the lens shift method, in order to suppress changes in the optical performance that occur when a predetermined lens is shifted, the number of lenses increases. Because the lenses need to be suspended midair (in a neutral position), there is an issue in that reducing power consumption is difficult.

The variable angle prism method does not have this issue that is seen in the lens shift method.

The variable angle prism method can be divided into two types. One is where a variable angle prism is placed on the side of the optical system that is closest to the object, and the other is where a variable angle prism is placed in the optical system itself.

An example where a variable angle prism is placed on the side of the optical system that is closest to the object can be seen in the optical system disclosed in Japanese Patent Application Publication No. S62-153816 (Patent Document 2).

A case where a variable angle prism is placed on the side of the optical system, which is closest to the object, is characteristic in that the change in the angle of field in relation to the amount, by which the angle of the variable angle prism is varied, is not dependent on the focal length of the zoom lens. When image blurring caused by camera movements that accompany hand movements and the like are to be corrected, it is advantageous in that the angle of the variable angle prism can be controlled independent of the focal length of the zoom lens. On the other hand, however, since image blurring is amplified in the maximum telephoto state, as the zoom ratio becomes greater, the stopping in the maximum telephoto state needs to be controlled with higher accuracy, and there is an issue in that higher precision is demanded for the drive system.

In addition, since the variable angle prism is placed on the object side of the first lens group, whose lens diameter is large, the diameter of the beam of light that is incident upon the variable angle prism is large, and as a result, there is an issue in that the variable angle prism itself becomes very large, and further in that protective measures, such as providing a protective glass and the like, need to be taken in order to prevent the user's hand from coming into direct contact with the variable angle prism. For these reasons, there is a limit as to the extent to which miniaturization can be carried out.

In contrast, examples where a variable angle prism is located within the optical system are disclosed in Japanese Patent Application Publication No. H02-168223 (Patent Document 1), Patent Document 2, Japanese Patent Application Publication No. H10-246855 (Patent Document 3), Japanese Patent Application Publication No. H11-44845 (Patent Document 4) and the like.

In the optical system disclosed in Patent Document 1, a variable angle prism is provided where the beam of light is parallel. In the optical system disclosed in Patent Document 2, a variable angle prism is provided before the master lens group. In the optical systems disclosed in Patent Document 3 and Patent Document 4, a variable angle prism is provided near the aperture stop.

With the optical systems disclosed in Patent Documents 1 through 4, since the axial beam of light is incident upon the variable angle prism in a state where it is close to being parallel, they are characteristic in that fluctuations in axial aberration that occur when the prism angle is varied can be reduced.

SUMMARY OF THE INVENTION

As described above, when a variable angle prism is located right before the lens system, there is an issue in that proper control of the prism is difficult since the deflection angle of the prism that is required for the correcting of image blurring that is caused by camera movements is independent of the focal length.

This issue arises due to the fact that, when applied to a zoom lens, the resolutions of the deflection angle required differs between the maximum wide-angle state, where the focal length is shortest, and the maximum telephoto state, where the focal length is greatest.

More specifically, in a case where a variable angle prism is located on the object side of the zoom lens, when the prism angle is tilted by $\alpha 0$, the resultant angle of emergence $\alpha 0'$ can be calculated by the Equation below:

$$\alpha 0' = \sin^{-1}(n \cdot \sin \alpha 0) \cdot \alpha 0$$

Here, if it is assumed that both $\alpha 0$ and $\alpha 0'$ are small values, the angle of emergence $\alpha 0'$ may be expressed as:

$$\alpha 0' = \alpha 0 (n \cdot 1)$$

Assuming that $\gamma$ is the angle by which the camera is deviated or moved due to hand movements and the like, it is possible to correct for image blurring by varying the prism angle in a manner that satisfies the condition below:

$$\alpha 0' + \gamma = 0$$

The lens shift method has an issue in that movements of more lenses may be needed to suppress changes in the optical performance that occur when a predetermined lens is shifted.

Accordingly, it is desirable to provide a zoom lens that allows for a reduction in the lens diameter, is capable of image shifting, and suppresses fluctuations in various aberrations that occur when the image is shifted, and/or an imaging apparatus that incorporates such a zoom lens. The present invention is made in view of the issues above.

A zoom lens according to an embodiment of the present invention includes a front group including a plurality of movable lens groups, and a rear group, which includes a negative lens and a positive lens and which is provided on the image side of the front group. The image side lens surface of the positive lens is flat, and the positive lens may be tilted about the spherical center of its object side lens surface, which is a convex surface. When the lens system is inclined, for example, due to some sudden impact or transient impact, the positive lens is tilted by angle $\alpha$ in relation to the optical axis of the lens system based on Equation (0) shown below:

$$\alpha = -f \cdot \theta / [Bf(n-1)] \quad (0)$$

where, $\alpha$ is the angle between the normal line of the image side lens surface of the positive lens provided within the rear group and the optical axis of the lens system, f is the focal length of the overall lens system, $\theta$ is the angle between the optical axis of the lens system as inclined and the optical axis of the lens system before it is inclined, Bf is the distance between the image side lens surface of the positive lens provided within the rear group and the image plane, and n is the refractive index of the positive lens provided within the rear group.

An imaging apparatus according to an embodiment of the present invention includes a zoom lens, an imaging device that converts the optical image formed by the zoom lens into electrical signals, a movement detection section that detects the axial inclination of the zoom lens, a computing section that computes the amount of correction based on the detection by the movement detection section, and a movement correction drive section that performs a movement correction operation in accordance with the correction amount computed by the computing section. The zoom lens include a front group that includes a plurality of movable lens groups, and a rear group that is located on the image side of the front group and that includes a negative lens and a positive lens. The image side lens surface of the positive lens is flat, and the positive lens may be tilted about the spherical center of its object side lens surface, which is a convex surface. When the lens system is inclined, for example, due to some sudden impact, the positive lens is tilted by angle $\alpha$ in relation to the optical axis of the lens system based on Equation (0) shown below:

$$\alpha = -f \cdot \theta / [Bf(n-1)] \quad (0)$$

The movement detection section detects $\theta$, the computing section computes $\alpha$ based on Equation (0), and the movement correction drive section tilts the positive lens by $\alpha$.

According to the present invention, it is possible to correct for image blurring caused by hand movements and the like, while suppressing fluctuations in various aberrations that occur with image shifting, and further, it is possible to reduce the lens diameter.

BRIEF DESCRIPTION OF THE DRAWINGS

FIG. 23 is a rear view shown without a movable frame;

FIG. 24 is a sectional view along line 24-24 in FIG. 23; and

DETAILED DESCRIPTION OF EMBODIMENTS

Figure 1:
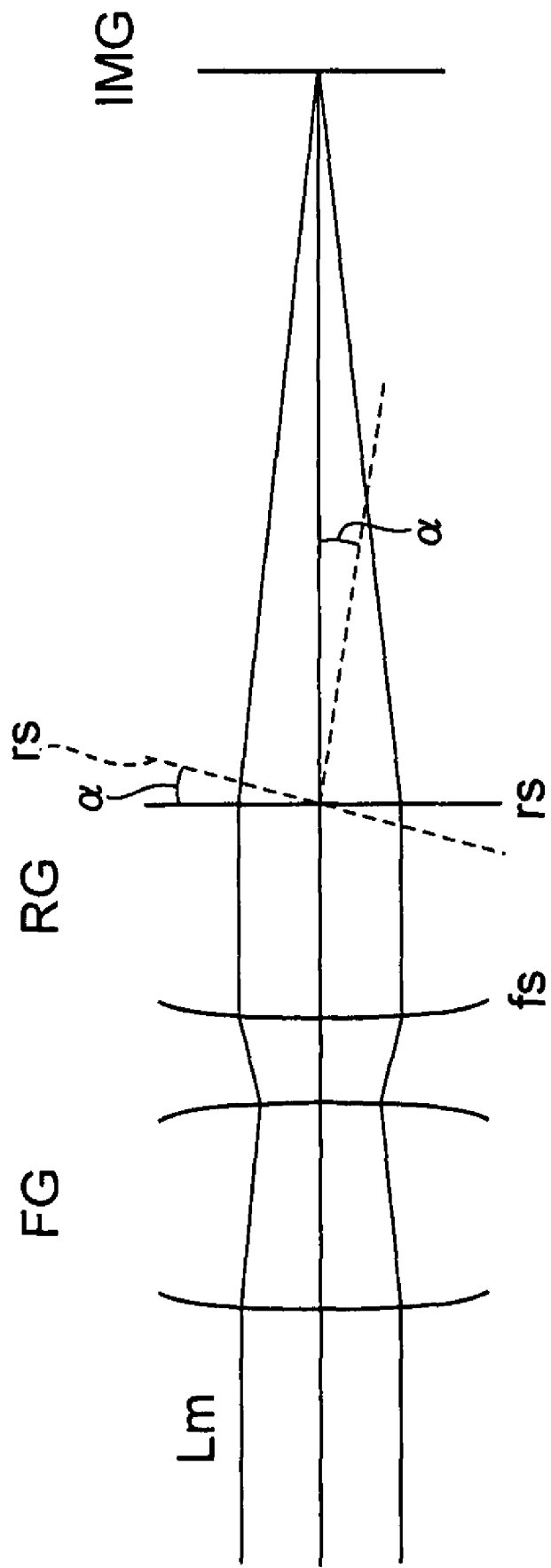
FIG. 1 is a diagram that illustrates the outline of a zoom lens according to an embodiment of the present invention.

Embodiments of the zoom lens and imaging apparatus of the present invention are described with reference to the drawings.

First, the zoom lens according to an embodiment of the present invention is described.

A zoom lens of the present embodiment include a front group that includes a plurality of movable lens groups, and a rear group that is provided on the image side of the front group and that includes a negative lens and a positive lens. The image side lens surface of the positive lens is flat, and the positive lens may be tilted about the spherical center of its object side lens surface, which is a convex surface. When the lens system is inclined due to some sudden impact or transient impact, the positive lens is tilted by angle α in relation to the optical axis of the lens system based on Equation (0) shown below:

$$\alpha = -\theta/[Bf(n-1)] \quad (0)$$

where, α is the angle between the normal line of the image side lens surface of the positive lens provided within the rear group and the optical axis of the lens system, f is the focal length of the overall lens system, θ is the angle between the optical axis of the lens system as inclined and the optical axis of the lens system before it is inclined, Bf is the distance between the image side lens surface of the positive lens provided within the rear group and the image plane, and n is the refractive index of the positive lens provided within the rear group.

Such a zoom lens of the present embodiment may be implemented through Embodiments 1 through 4 described below.

Embodiment 1

Regardless of the lens position state, the rear group is fixed in the direction of the optical axis, and the following conditional Equations are satisfied:

$$1 < fp/Bf < 3 \quad (1)$$

$$3 < Bf \cdot FNO/Ymax \quad (2)$$

where fp is the focal length of the positive lens provided within the rear group, FNO is the F number in the maximum telephoto state, and Ymax is the maximum image height.

Embodiment 2

The following conditional Equation is satisfied:

$$0.2 < Ymax/Rn < 0.7 \quad (3)$$

where Rn is the radius of curvature of the object side lens surface of the positive lens provided within the rear group.

Embodiment 3

An aperture stop is provided within the front group, and the front group includes at least one movable lens group on both the object side and image side of the aperture stop. The focal length varies as the movable groups move, and the following conditional Equation is satisfied:

$$0.4 < Ds/TL < 0.7 \quad (4)$$

where Ds is the distance between the aperture stop and the image plane along the optical axis in the maximum wide-angle state, and TL is the distance between the lens surface of the zoom lens that is closest to the object and the image plane along the optical axis in the maximum wide-angle state.

Embodiment 4

The following conditional Equation is satisfied:

$$vdn > 58 \quad (5)$$

where vdn is the Abbe number of the positive lens provided within the rear group with respect to the d-line (λ=587.6 nm).

It is noted that the embodiments indicated above are merely examples of a zoom lens of the present invention, and by no means limit the implementation of the present invention in Embodiments besides those described above.

Details of a zoom lens of the present embodiment are described below.

The zoom lens includes a front group that is provided on the object side of the lens system and that includes a plurality of movable lens groups, and a rear group that is provided on the image side of the front group and that includes a negative lens and a positive lens. The positive lens has aspheric surface that is convex on the object side, and a flat surface on the image side. This flat surface is hereinafter referred to as the "final surface" since it is the lens surface that is on the side of the lens system that is closest to the image. By rotating the positive lens about the spherical center of its object side lens surface, the rear group gains the function of aberration correction while utilizing the effect of a variable angle prism, and an increase in the number of lenses making up the zoom lens is thus suppressed.

First, a method of image shift with a zoom lens of the present embodiment is described.

Since its object side lens surface is a convex spherical surface and its image side lens surface is a flat surface, when the positive lens, which is provided on the side of the optical system that is closest to the image, is rotated about the spherical center of its object side lens surface, only the angle of the final surface (the image side lens surface) in relation to the optical axis varies (due to the fact that the spherical center of the object side lens surface does not move).

In a zoom lens of the present embodiment, the image is shifted by making use of the prism effect based on the change in the angle (tilting) of the final surface with respect to the optical axis.

In a zoom lens of the present embodiment, the tilt amount of the final surface that is required in order to correct for image blurring is a function of the focal length of the lens, and the positive lens is driven in the manner described below in order to correct for image blurring that is caused by movements of the camera due to hand movements and the like.

The amount of image blurring δs can be calculated with the following Equation:

$$\delta s = f \cdot \tan \theta$$

where θ is the angle by which the camera is moved, and f is the focal length.

A schematic diagram of a zoom lens of the present embodiment is shown in FIG. 1.

An axial beam of light Lm that emerges from a front group FG passes through a rear group RG and reaches an image plane IMG.

Here, an angle of emergence α' for a case where a final surface rS is tilted by a tilt angle α is given by:

$$\alpha' = \sin^{-1}(n \cdot \sin \alpha) - \alpha$$

The Equation above can be solved to obtain the following Equation:

$$\sin(\alpha'+\alpha)=n\cdot\sin\alpha$$

Assuming that $\alpha$ and $\alpha'$ above are both negligible values, it is possible to approximate as $$\sin(\alpha'+\alpha)\cong(\alpha'+\alpha), \text{ and}$$

$$\sin\alpha\cong\alpha$$

and the Equation can be further solved to obtain $$\alpha'+\alpha=n\cdot\alpha$$

Thus the angle of emergence $\alpha'$ can be calculated with the following Equation:

$$\alpha'=\alpha(n\cdot1)$$

Assuming that the distance between the final surface rS and the image plane IMG is Bf, an image shift amount $\delta h$ can be expressed as $$\delta h = Bf\cdot\alpha' = Bf\cdot\alpha(n-1)$$

If the image blurring amount $\delta s$ caused by camera movements is to be corrected for by the image shift amount $\delta h$ brought about by the tilting of the emergent surface rS, then $$\delta s+\delta h=0$$

Assuming that the angle of movement $\theta$ of the camera is a very small value, the approximation $$\tan\theta\cong\theta$$

holds true, and thus the following Equation is obtained:

$$f\theta+Bf\cdot\alpha(n-1)=0$$

Thus, with a zoom lens of the present embodiment, when the camera is involuntarily moved by angle $\theta$ image blurring caused by this movement of the camera can be corrected for by tilting the final surface rS by the corrective angle $\alpha$ expressed by the Equation below.

$$\alpha=-f\cdot\theta/[Bf(n-1)] \quad (0)$$

It is noted that while it is preferable that the final surface rS be tilted in accordance with Equation (0) shown above if image blurring is to be completely corrected for, even if such a drive that would correct for 100% of the image blurring cannot be carried out (for example, if only 80% of the image blurring is corrected for), image blurring is alleviated to some extent, and image quality would thus improve.

There are examples where a variable angle prism is provided within the optical system. Such examples include those in which a variable angle prism is provided at a position where the beam of light becomes parallel, those in which a variable angle prism is provided before the master lens group, those in which a variable angle prism is provided near the aperture stop, and the like.

In these known examples, since the axial beam of light is incident upon the variable angle prism in a state where it is almost a parallel beam of light, they are advantageous in that fluctuations in axial aberration can be kept small when the prism angle is varied.

However, the beam of light that passes through the optical system reaches the image plane after being refracted by the lenses. As a result, the beam of light that is headed towards the center portion of the screen reaches the image plane after being diverged and converged. At the same time, the principal ray that is headed towards the periphery reaches the image plane after having varied its angle in relation to the optical axis. As a result, when a variable angle prism is provided within the optical system, while there is an advantage in terms of miniaturization as compared to a case where a variable angle prism is provided further towards the object than the first lens group, there are such issues as occurrences of coma aberration, fluctuations in chromatic aberration, occurrences of keystone distortion and the like. In particular, with respect to keystone distortion, while image blurring around the center of the screen can be well corrected for, the same cannot be the for image blurring in the periphery. Keystone distortion tends to be particularly pronounced at a position where the principal ray and the optical axis form a large angle when the beam of light is not a parallel beam.

With a zoom lens of the present embodiment, by having the final surface function as a prism, the lens diameter can be reduced as compared to a case where a variable angle prism is provided on the object side of the lens system.

In particular, by focusing attention on back-focus and the positioning of the exit pupil, better optical performance can be attained.

One option is to distance the exit pupil from the image plane, in other words to create a state that is close to an image side telecentric optical system.

The cause of keystone distortion is the fact that when the final surface is tilted, the angle at which light is incident upon the final surface varies with the position at which light is incident upon the final surface. As such, a zoom lens of the present embodiment takes advantage of the fact that by creating a state that is close to parallel, the incident angle is substantially the same even when the final surface is tilted.

In particular, with a zoom lens of the present embodiment, by providing a negative lens and a positive lens on the side of the zoom lens that is closest to the image, and enhancing or weakening both the refractive powers of the negative lens and the positive lens, a function of adjusting the exit pupil position at a predetermined position is achieved. As a result, it becomes possible to distance the exit pupil position from the image plane, and thus to suppress occurrences of keystone distortion.

In addition, it simultaneously becomes possible to effectively correct for negative distortion that occurs in the maximum wide-angle state.

By providing a rear group as described above, more freedom is ensured for the lens configuration of the front group, and as a result, it is possible to make the number of constituent lenses not increase as much.

In addition, by widening back-focus, it is possible to reduce the tilt amount for the final surface that is required in order to shift the image by a predetermined amount.

When the final surface of the zoom lens is tilted, the tilt amount for the final surface is a function of the focal length as described above. For this reason, as the zoom ratio becomes greater, the tilt amount in the maximum telephoto state becomes greater, thus giving rise to the issue that coma aberration is more likely to occur.

The amount of such coma aberration is a function of the F number (focal ratio) of the zoom lens.

Assuming that FNO is the F number, then the maximum angle $\theta F$ of the axial beam of light that emerges from the final surface can be calculated with the Equation below.

$$\theta F=\tan^{-1}(\tfrac{1}{2}FNO)$$

Here, as the ratio $\theta F/\alpha$ between the tilt angle $\alpha$ of the final surface and the maximum emergent angle $\theta F$ becomes greater, occurrences of coma aberration become more pronounced. As such, with a zoom lens of the present embodiment, by reducing the value of θF/α, coma aberration that occurs when the apex angle of the final surface is varied is suppressed.

As described above, the image shift amount δy for when the final surface is tilted by tilt angle cc is expressed as:

$$\delta y = Bf \cdot \alpha (n-1)$$

Therefore, the longer the distance Bf from the final surface to the image plane is made, the smaller the tilt angle α can be made.

Thus, with a zoom lens of the present embodiment, the distance Bf from the final surface to the image plane is made as long as possible without causing an extreme growth in size.

With a zoom lens of the present embodiment, by adopting the configuration described above, coma aberration and keystone distortion that occur when the image is shifted can be suppressed, and better optical performance can thus be attained.

In addition, with a zoom lens of the present embodiment, by fixing the rear group in the direction of the optical axis, the drive mechanism for tilting the positive lens can be simplified.

With a zoom lens according to an embodiment of the present invention, it is preferable that conditional Equations (1) and (2) given below be satisfied.

$$1 < fp/Bf < 3 \quad (1)$$

$$3 < Bf \cdot FNO/Ymax \quad (2)$$

where fp is the focal length of the positive lens provided within the rear group, FNO is the F number in the maximum telephoto state, and Ymax is the maximum image height.

Conditional Equation (1) defines the focal length of the positive lens provided within the rear group and is a conditional Equation for suppressing keystone distortion that occurs when the positive lens is tilted.

When the lower limit value for conditional Equation (1) is not satisfied, the exit pupil position is positioned on the rear side of the image plane, and the angle formed between the principal ray that emerges from the positive lens and the optical axis becomes greater. Therefore, when the positive lens is tilted, the angle formed between the principal ray and the normal line of the final surface varies depending on the height of the light beam, and as a result, keystone distortion is caused.

On the contrary, when the upper limit value for conditional Equation (1) is exceeded, the exit pupil position is positioned before the image plane, and the angle formed between the principal ray that emerges from the positive lens and the optical axis becomes greater. Therefore, keystone distortion that is the inverse of that for the case where the lower limit value is not satisfied is caused.

For these reasons, falling out of the range defined by conditional Equation (1) causes the size of the image to change due to keystone distortion that occurs when the image is shifted, and is therefore undesirable.

Conditional Equation (2) defines back-focus.

When the lower limit value for conditional Equation (2) is not satisfied, back-focus becomes shorter, and the deflection angle of the final surface that is required to shift the image by a predetermined amount, in other words α, becomes greater. As a result, it becomes difficult to effectively suppress fluctuations in coma aberration that occur when the image is shifted.

It is noted that it is preferable that the upper limit value for conditional Equation (2) be 12. When back-focus becomes too long, it causes the size of the overall lens system to become bigger, and is therefore undesirable.

With a zoom lens according to an embodiment of the present invention, it is preferable that conditional Equation (3) given below be satisfied.

$$0.2 < Ymax/Rn < 0.7 \quad (3)$$

where Rn is the radius of curvature of the object side lens surface of the positive lens provided within the rear group.

Conditional Equation (3) defines the radius of curvature of the object side lens surface of the positive lens.

When the upper limit value for conditional Equation (3) is exceeded, the off-axis beam of light is drastically refracted by the positive lens, and substantial coma aberration occurs in the periphery of the screen. As a result, it becomes difficult to sufficiently attain better performance.

On the other hand, when the lower limit value for conditional Equation (3) is not satisfied, the tilt amount α that is required in order to shift the image by a predetermined amount becomes too large, and it becomes difficult to achieve a sufficient degree of miniaturization.

With a zoom lens according to an embodiment of the present invention, in order to achieve a balance between a reduction in the lens diameter and better performance, an aperture stop is provided within the front group, and the front group includes at least one movable lens group on both the object side and the image side of the aperture stop. And it is preferable that the focal length be varied by moving the movable lens groups, and that conditional Equation (4) given below be satisfied.

$$0.4 < Ds/TL < 0.7 \quad (4)$$

where Ds is the distance between the aperture stop and the image plane along the optical axis in the maximum wide-angle state, and TL is the distance between the lens surface on the side of the zoom lens that is closest to the object and the image plane along the optical axis in the maximum wide-angle state.

With a zoom lens of the present embodiment, it is possible to adjust the exit pupil position by way of the rear group, but in general, depending on where in the overall optical system the aperture stop is positioned, fluctuations in the off-axis aberration that accompany changes in the lens position vary. Therefore, in order to achieve better performance, it is preferable that attention be given to the positioning of the aperture stop.

With a zoom lens, in correcting for fluctuations in off-axis aberration that accompany changes in the angle of field, it is effective to actively vary the height of the off-axis beam of light that passes through each lens group. In particular, when there are provided movable lens groups on both the object side and image side of the aperture stop, it is possible to effectively correct for fluctuations in off-axis aberration that occur when the lens position state is changed from the maximum wide-angle state, where the focal length is shortest, to the maximum telephoto state, where the focal length is greatest.

In addition, if a movable lens group is disposed only on the object side of the aperture stop, the aperture stop position moves towards the image side in view of the movement space for the movable lens group. As a result, the off-axis beam of light that passes through the lens groups that are distanced from the aperture stop moves away from the optical axis, and it becomes difficult to sufficiently achieve a reduction in the lens diameter. Similarly, when a movable lens group exists only on the image side of the aperture stop, it ultimately is difficult to achieve a sufficient reduction in the lens diameter.

As such, in order to achieve both a reduction in the lens diameter and better performance, it is preferable that the front group be configured with two partial groups including a first partial group and a second partial group, that an aperture stop be provided between those two partial groups, and that each of the first partial group and the second partial group include at least one movable lens group.

Conditional Equation (4) defines the position of the aperture stop within the lens system.

When the lower limit value of conditional Equation (4) is not satisfied, in the maximum wide-angle state, the off-axis beam of light that passes through the lens group that is positioned on the side that is closest to the object moves away from the optical axis, and it becomes difficult to achieve a sufficient reduction in the lens diameter.

When the upper limit value of conditional Equation (4) is exceeded, the principal ray that emerges from the front group approaches the optical axis, and since the negative lens in the rear group has an extremely strong refractive power, coma aberration becomes very pronounced in the peripheral section of the screen, and it becomes difficult to obtain the desired optical performance.

With a zoom lens according to an embodiment of the present invention, in order to reduce fluctuations in chromatic aberration that occur when the image is shifted, and in order to achieve better performance, it is preferable that conditional Equation (5) given below be satisfied.

$$vdn > 58 \quad (5)$$

where vdn is the Abbe number of the positive lens with respect to the d-line.

Conditional Equation (5) defines the Abbe number of the positive lens.

When the lower limit value of conditional Equation (5) is not satisfied, occurrences of chromatic aberration that accompany the tilting of the final surface become too significant, and it becomes difficult to achieve better performance.

Next, a specific embodiment of a zoom lens of the present invention and a numerical embodiment in which specific values are applied to this specific embodiment are described with references to the drawings and tables.

In each embodiment, an aspheric surface is introduced, and the form of this aspheric surface is to be defined by Equation 1.

$$X = cy^2/(1 + (1-(1+\kappa)c^2y^2)^{1/2}) + Ay^4 + By^6 + \ldots \quad \text{[Equation 1]}$$

It is noted that y is the height from the optical axis, x is the sag amount, c is the curvature, κ is the conic constant, and A, B, . . . are aspheric coefficients.

Figure 2:
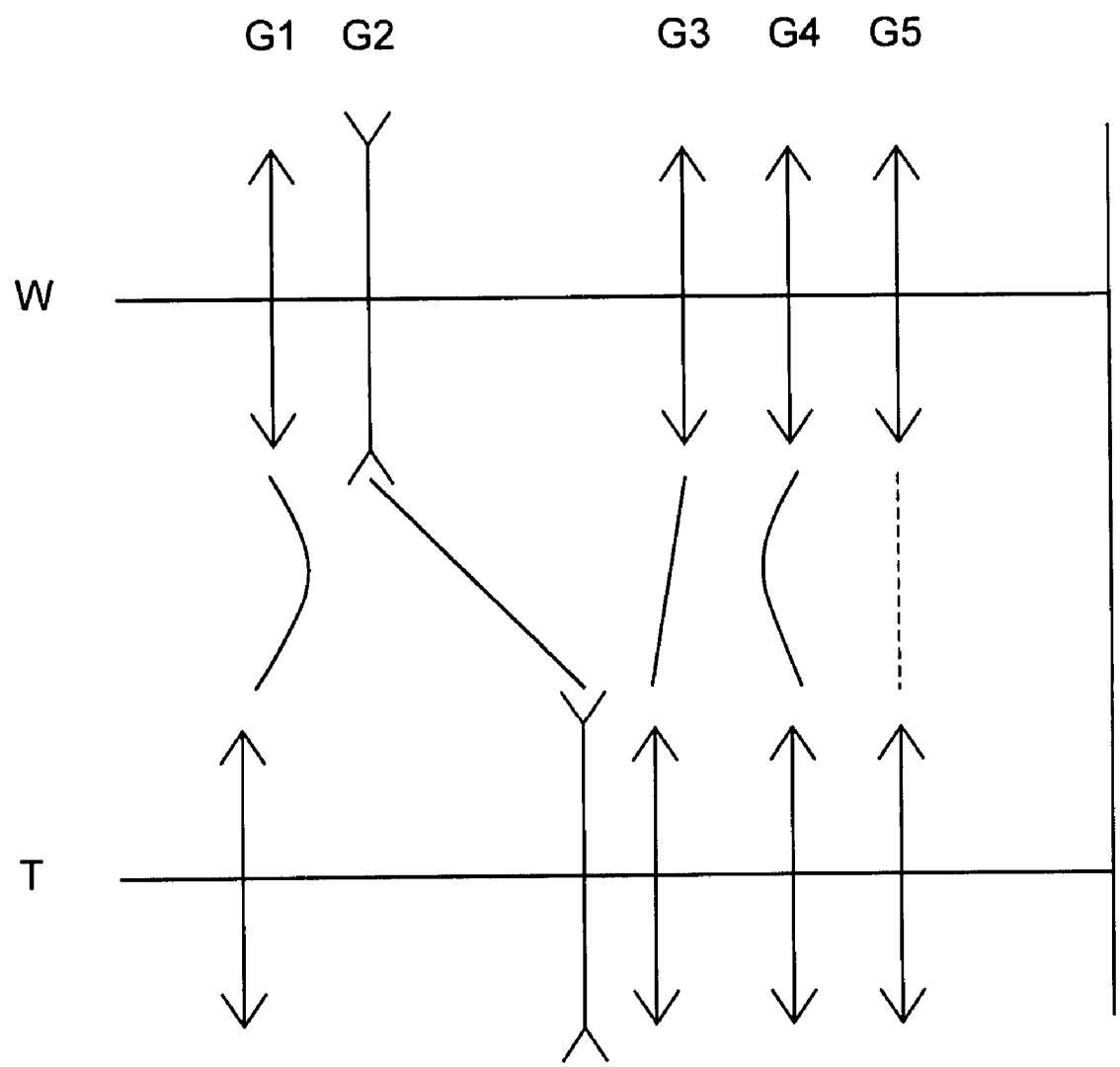
FIG. 2, along with FIGS. 3 through 11, indicates an embodiment of a zoom lens of the present invention, and is a diagram that indicates the distribution of refractive power as well as whether or not each of the lens groups is movable during zooming.

FIG. 2 indicates the distribution of refractive power of a zoom lens related to a first embodiment of the present invention. From the object side and in order, there are provided a first lens group G1 having a positive refractive power, a second lens group G2 having a negative refractive power, a third lens group G3 having a positive refractive power, a fourth lens group G4 having a positive refractive power, and a fifth lens group G5 having a positive refractive power. In zooming from the maximum wide-angle state to the maximum telephoto state, the second lens group G2 moves towards the image, the first lens group G1 moves towards the object after first moving towards the image, and the third lens group G3 moves towards the object in such a manner that the air gap between the first lens group G1 and the second lens group G2 becomes larger, while the air gap between the second lens group G2 and the third lens group G3 becomes smaller. Here, the fifth lens group G5 is stationary, and the fourth lens group G4 moves towards the object during close range focusing.

Figure 3:
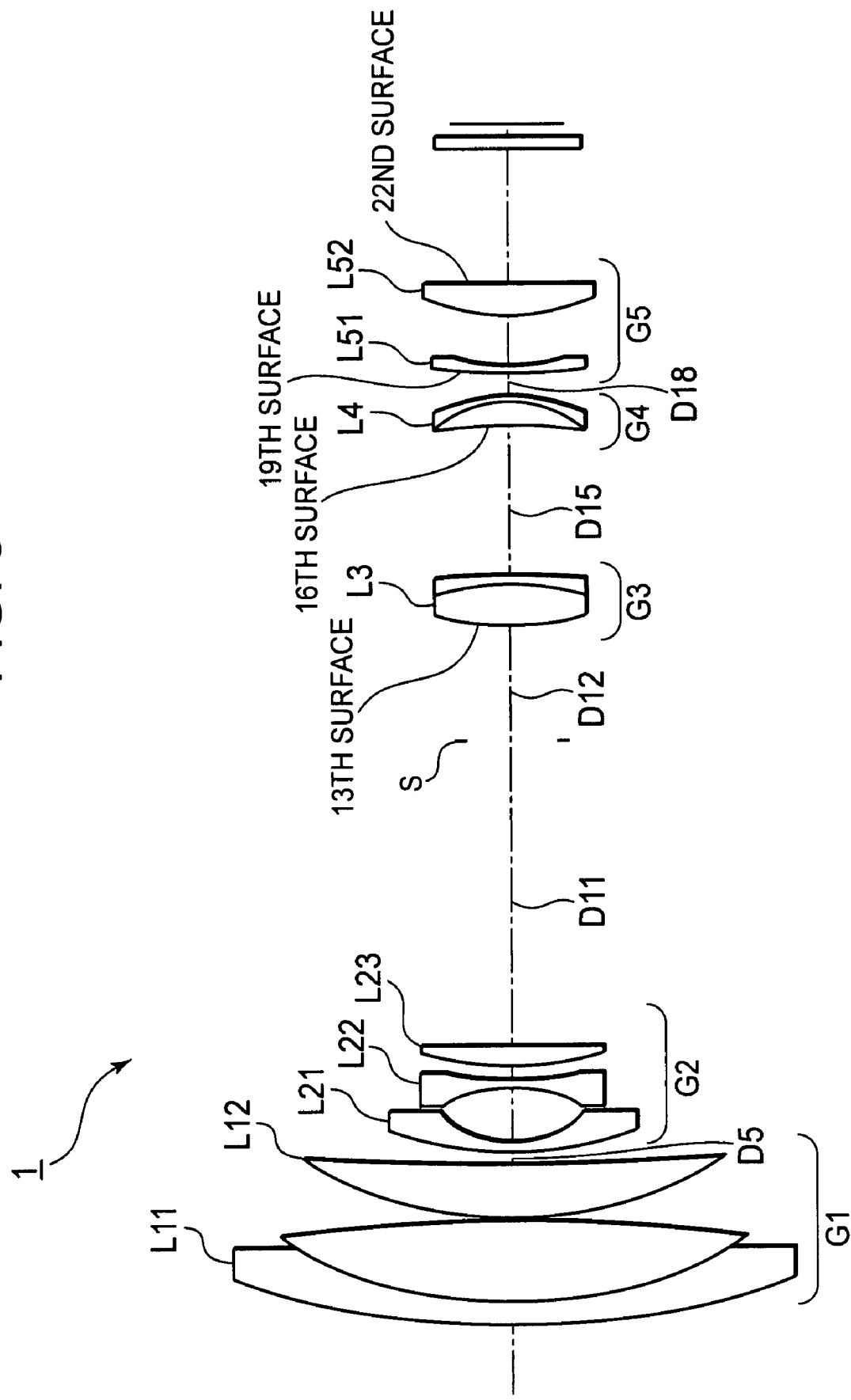
FIG. 3 is a diagram indicating a lens configuration.

FIG. 3 indicates the lens configuration of a zoom lens 1 related to the first embodiment of the present invention, and each lens group is configured in the manner described below.

The first lens group G1 includes, in order and from the side of the object, a cemented lens L11, which is of a negative lens having a meniscus shape and whose convex surface is turned towards the object and a positive lens whose convex surface is turned towards the object, as well as a positive lens L12 whose convex surface is turned towards the object. The second lens group G2 includes, in order and from the side of the object, a negative lens L21 of a meniscus shape whose concave surface is turned towards the image, a negative lens L22 of a bi-concave shape and a positive lens L23 of a meniscus shape and whose convex surface is turned towards the object. The third lens group G3 includes, in order and from the side of the object, a cemented positive lens L3, which is of a positive lens of a bi-convex shape and that has an aspheric surface on the object side and a negative lens of a meniscus shape and whose concave surface is turned towards the object. The fourth lens group G4 includes, in order and from the side of the object, a cemented positive lens L4, which is of a positive lens having a meniscus shape with a concave surface, which is configured as an aspheric surface, turned towards the object and a negative lens of a meniscus shape whose concave surface is turned towards the object. The fifth lens group G5 includes, in order and from the side of the object, a negative lens L51 of a meniscus shape whose concave surface is turned towards the image and whose object side surface is an aspheric surface, and a positive lens L52 whose image side lens surface is a flat surface.

In this zoom lens 1, the first through fourth lens groups G1~G4 form the front group, and the fifth lens group G5 forms the rear group. By rotationally driving the positive lens L52 within the fifth lens group G5 about the spherical center of its object side lens surface, it is possible to shift the image. In addition, an aperture stop S is positioned between the second lens group G2 and the third lens group G3. Therefore, there exists at least one movable lens group on both the front and rear sides of the aperture stop S (G1 and G2 on the front side, and G3 and G4 on the rear side).

Data values for numerical embodiment 1 in which specific numerical values are applied to the zoom lens 1 related to the first embodiment are indicated in Table 1. In Table 1 as well as the subsequent tables, f represents the focal length, FNO the F number, and 2ω the angle of field. The refractive indices and Abbe numbers provided in these tables are in relation to the d-line. It is noted that in Table 1, a zero radius of curvature represents a flat surface. In addition, with respect to surface gap, D1 indicates the fact that the corresponding surface gap is a variable gap.

TABLE 1 f 1.00~3.01~7.25~14.10
FN0 2.87~3.39~3.80~4.57
2ω 71.29~24.40~10.38~5.37°

| Surface No. | Radius of Curvature | Surface Gap | Refractive Index | Abbe No. |
|---|---|---|---|---|
| 1: | 11.8755 | 0.270 | 1.90366 | 31.32 |
| 2: | 6.0980 | 1.063 | 1.49700 | 81.60 |
| 3: | −25.3794 | 0.037 | | |
| 4: | 5.6445 | 0.664 | 1.60300 | 65.44 |
| 5: | 33.0745 | (D5) | | |
| 6: | 4.4007 | 0.131 | 1.75500 | 52.32 |
| 7: | 1.3753 | 0.714 | | |
| 8: | −2.0338 | 0.112 | 1.80420 | 46.50 |
| 9: | 4.3617 | 0.186 | | |

TABLE 1-continued f 1.00~3.01~7.25~14.10
FN0 2.87~3.39~3.80~4.57
2ω 71.29~24.40~10.38~5.37°

| Surface No. | Radius of Curvature | Surface Gap | Refractive Index | Abbe No. | |
|---|---|---|---|---|---|
| 10: | 4.4197 | 0.263 | 1.94596 | 17.99 | |
| 11: | −38.6035 | (D11) | | | |
| 12: | 0.0000 | (D12) | | | Aperture Stop |
| 13: | 3.4753 | 0.541 | 1.69350 | 53.34 | |
| 14: | −3.4928 | 0.112 | 1.84666 | 23.83 | |
| 15: | −7.7852 | (D15) | | | |
| 16: | −8.6037 | 0.338 | 1.58913 | 61.25 | |
| 17: | −1.5317 | 0.075 | 1.90366 | 31.32 | |
| 18: | −2.3089 | (D18) | | | |
| 19: | 7.2565 | 0.093 | 1.83400 | 37.36 | |
| 20: | 2.7970 | 0.653 | | | |
| 21: | 2.5288 | 0.405 | 1.60300 | 65.44 | |
| 22: | 0.0000 | 0.093 | | | |
| 23: | 0.0000 | 1.679 | | | |
| 24: | 0.0000 | 0.149 | 1.51680 | 64.20 | |
| 25: | 0.0000 | (Bf) | | | |

The surface of the third lens group G3 that is closest to the object (the thirteenth surface), the surface of the fourth lens group G4 that is closest to the object (the sixteenth surface), and the object side surface of the negative lens L51 in the fifth lens group G5 (the nineteenth surface) are aspheric surfaces. As such, the fourth-, sixth-, eighth- and tenth-order aspheric coefficients A, B, C and D, respectively, of these surfaces in numerical embodiment 1 are shown in Table 2. It is noted that in Table 2 and the subsequent tables showing the aspheric coefficients, "E−i" is an exponential notation to base 10, in other words, "E−i" represents "$10^{-i}$", and, "0.12345E−05" represents, for example, "$0.12345 \times 10^{-5}$".

TABLE 2

| 13th Surface | κ = 0.000000 | A = −0.653874E−02 | B = +0.217740E−02 | C = −0.274308E−02 |
| | | D = +0.146361E−02 | | |
| 16th Surface | κ = 0.000000 | A = −0.650301E−02 | B = −0.152271E−01 | C = +0.267660E−01 |
| | | D = −0.158910E−01 | | |
| 19th Surface | κ = 0.000000 | A = −0.765590E−02 | B = +0.169151E−01 | C = −0.265411E−01 |
| | | D = +0.148085E−01 | | |

As the lens position state changes from the wide-angle end to the telephoto end, surface gap D5 between the first lens group G1 and the second lens group G2, surface gap D11 between the second lens group G2 and the aperture stop S, surface gap D12 between the aperture stop S and the third lens group G3, surface gap D15 between the third lens group G3 and the fourth lens group G4, and surface gap D18 between the fourth lens group G4 and the fifth lens group G5 change. As such, values for each of the surface gaps D5, D11, D12, D15 and D18 with respect to numerical embodiment 1 at the wide-angle end (f=1.000), a first mid-focal length (f=3.0054), a second mid-focal length (f=7.2467) and the telephoto end (f=14.0983) are shown in Table 3.

TABLE 3

| | f | | | |
|---|---|---|---|---|
| | 1.0000 | 3.0054 | 7.2467 | 14.0983 |
| D5 | 0.1678 | 2.8643 | 4.4582 | 5.2298 |
| D11 | 4.0083 | 1.6946 | 0.6643 | 0.4848 |

TABLE 3-continued

| | f | | | |
|---|---|---|---|---|
| | 1.0000 | 3.0054 | 7.2467 | 14.0983 |
| D12 | 1.5177 | 1.1371 | 0.9978 | 0.2238 |
| D15 | 1.9383 | 1.3766 | 1.5101 | 2.2643 |
| D18 | 0.2797 | 1.7783 | 2.5404 | 2.6895 |
| Bf | 0.1740 | 0.1740 | 0.1740 | 0.1740 |

With respect to numerical embodiment 1, the tilt angle (α) of the final surface (the image side surface of the positive lens L52 within the fifth lens group G5 (the twenty-second surface)) that is required in order to correct for image blurring caused by an axial inclination of 0.3 degrees (θ=0.3) at the wide-angle end (f=1.00), the first mid-focal length (f=3.0054), the second mid-focal length (f=7.2467), and the telephoto end (f=14.0983) are shown in Table 4.

TABLE 4

| | f | | | |
|---|---|---|---|---|
| | 1.0000 | 3.0054 | 7.2467 | 14.0983 |
| Surface of Emergence | $0.243^{DEG.}$ | $0.732^{DEG.}$ | $1.760^{DEG.}$ | $3.42^{DEG.}$ |

With respect to numerical embodiment 1, the focal length fp of the positive lens L52 within the fifth lens group G5 as well as the corresponding values for conditional Equations (1) through (5) are shown in Table 5.

TABLE 5 fp = 4.194

(1) fp/Bf = 2.051
(2) Bf · FN0/Ymax = 13.732
(3) Ymax/Rn = 0.269
(4) Ds/TL = 0.514
(5) νdn = 65.4

Figure 4:
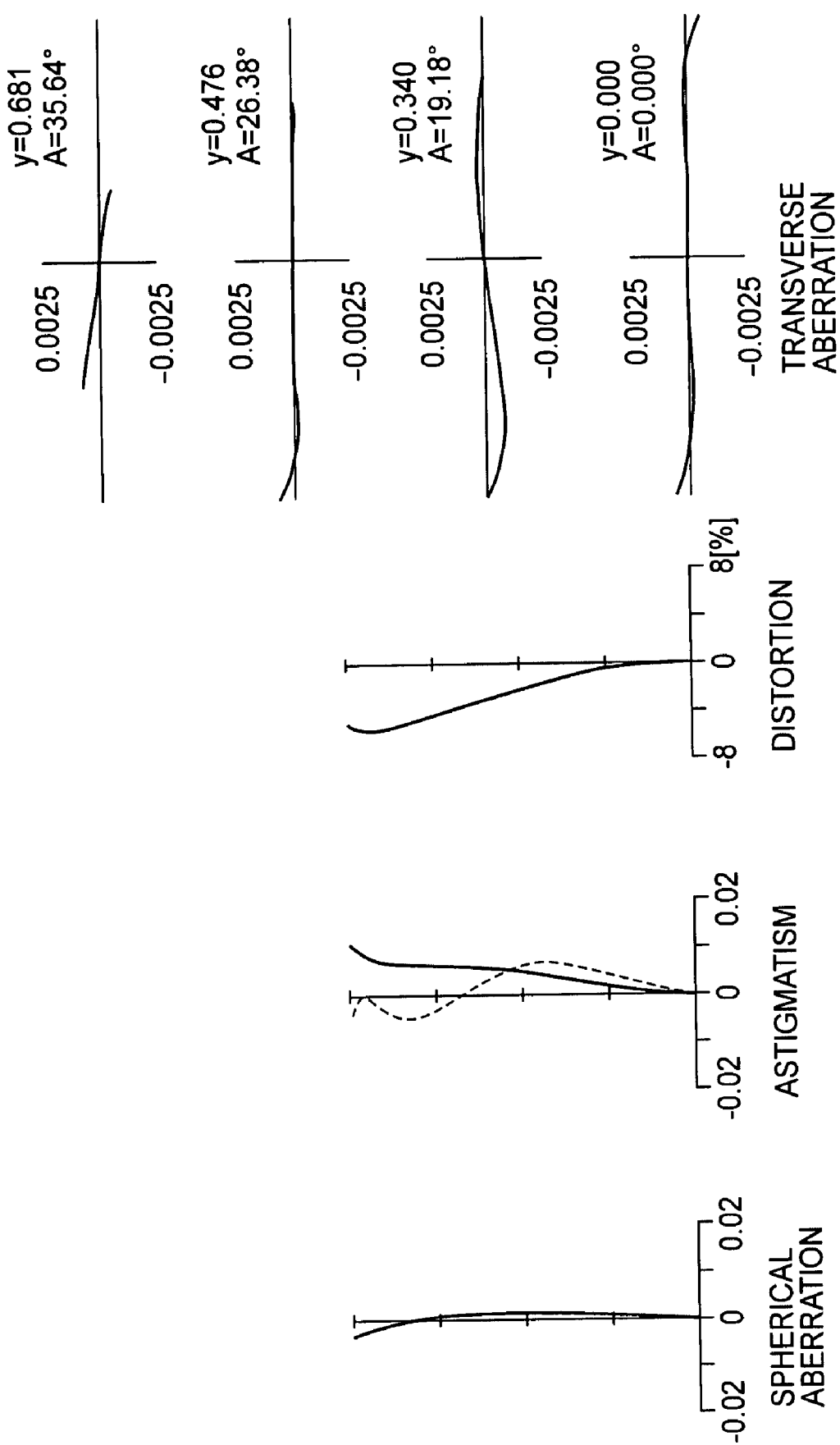
FIG. 4, along with FIGS. 5 through 7, shows various aberration graphs with respect to a numerical embodiment in which specific values are applied to an embodiment of the present invention focused at infinity, and the graphs in FIG. 4 illustrate the spherical aberration, astigmatism, distortion and transverse aberration in a maximum wide-angle state.
Figure 5:
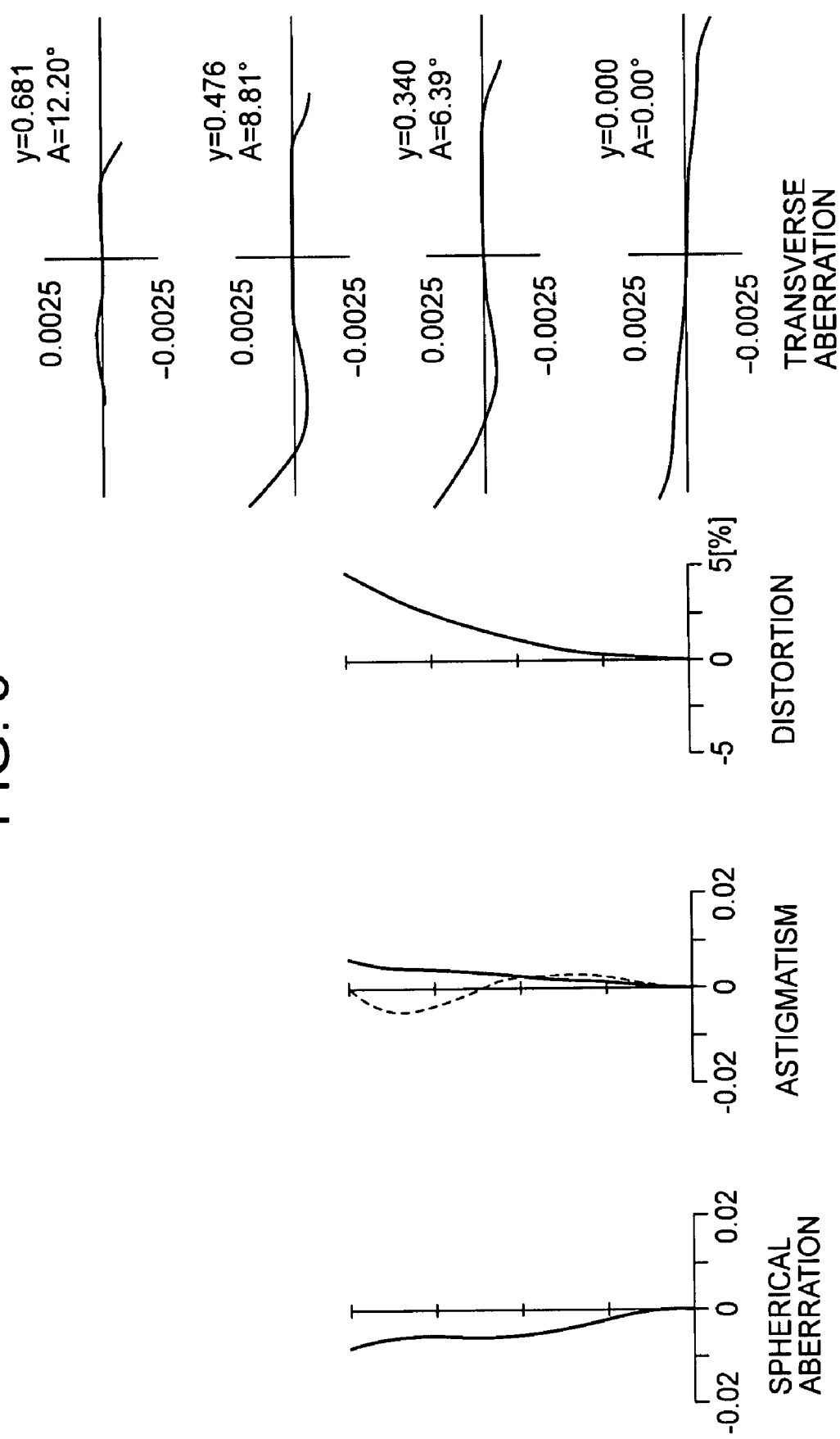
FIG. 5 illustrates the spherical aberration, astigmatism, distortion and transverse aberration in a first mid-focal length state.
Figure 6:
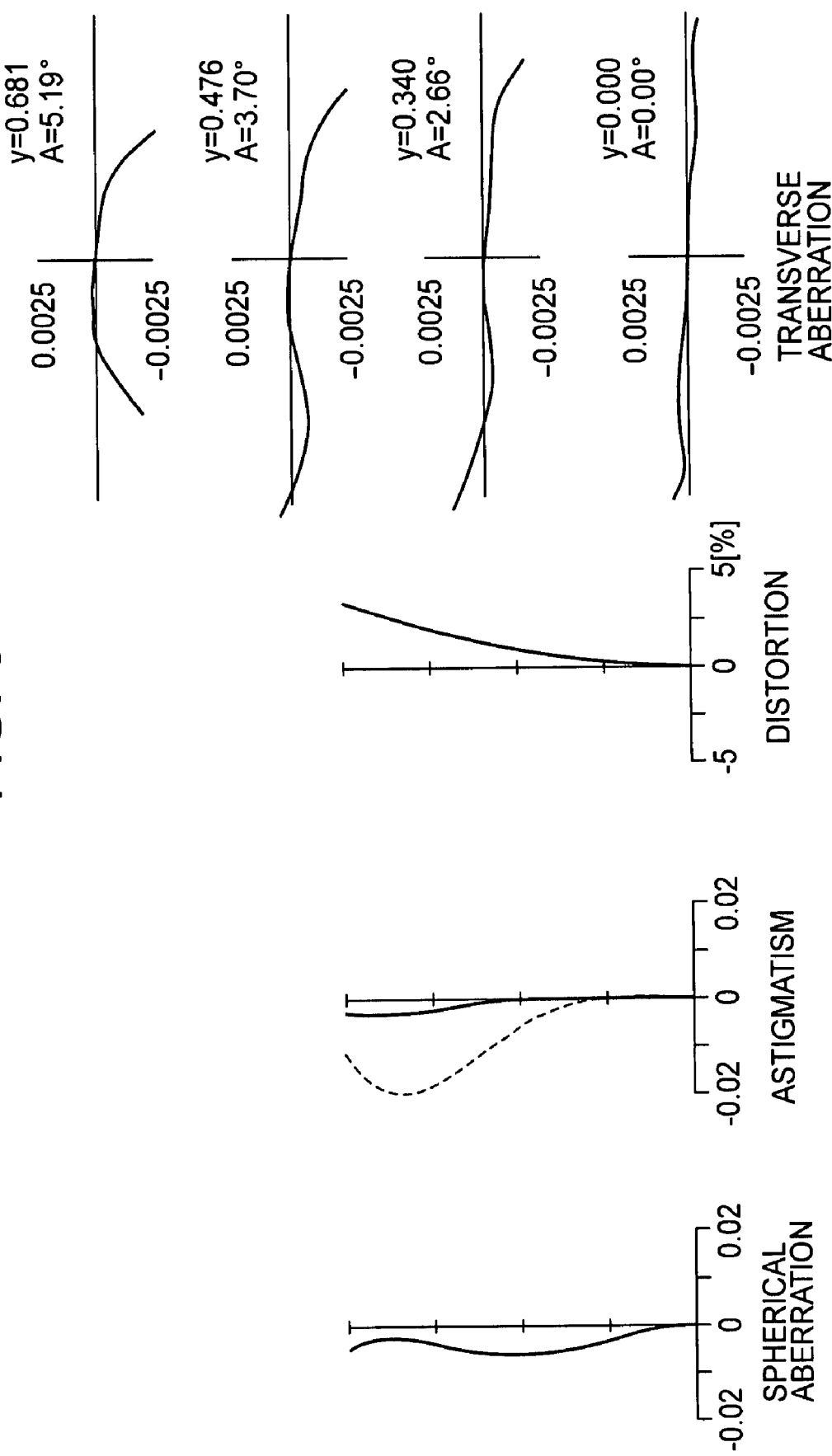
FIG. 6 illustrates the spherical aberration, astigmatism, distortion and transverse aberration in a second mid-focal length state.
Figure 7:
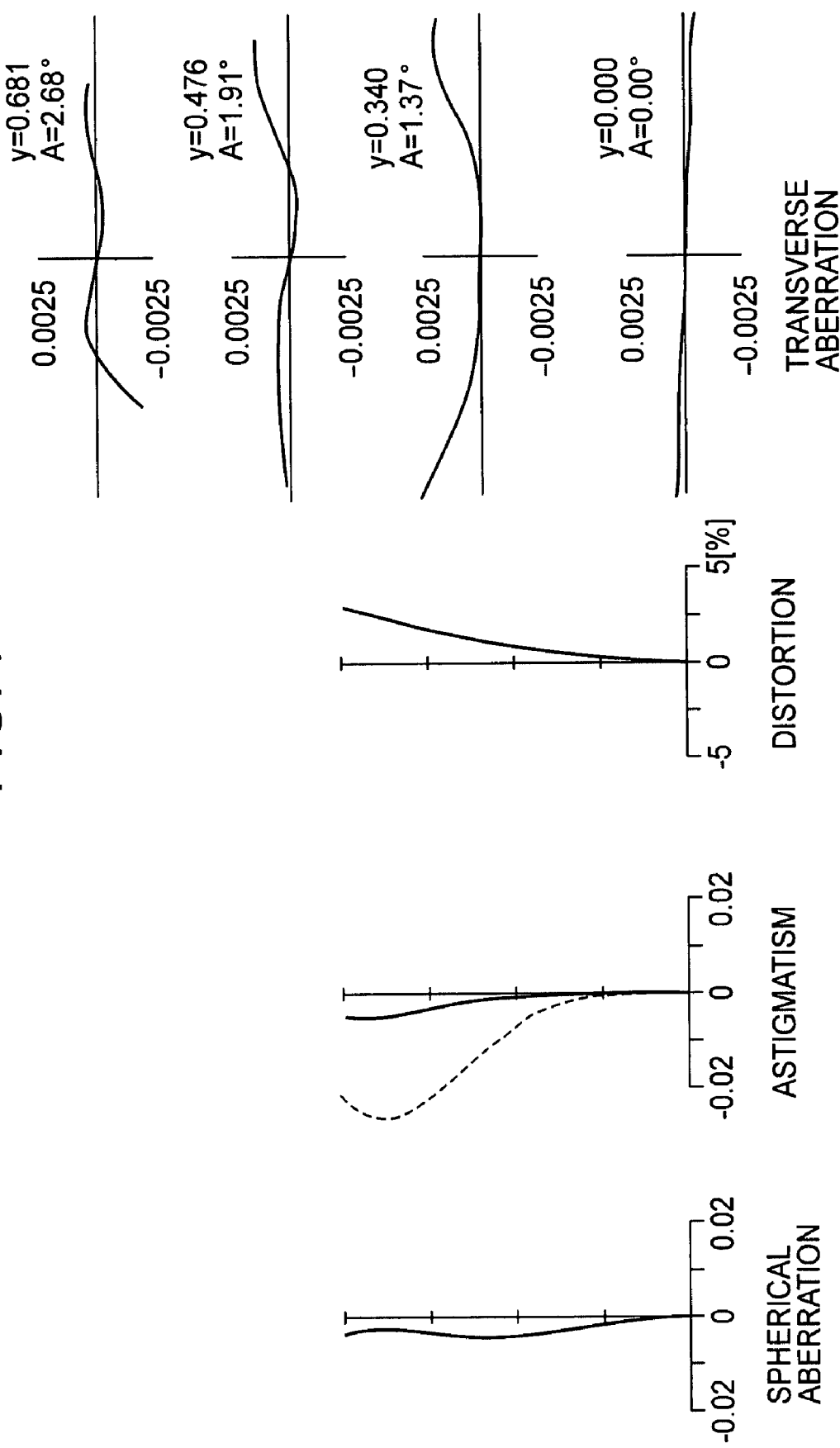
FIG. 7 illustrates the spherical aberration, astigmatism, distortion and transverse aberration in a maximum telephoto state.

FIGS. 4 through 7 show various aberration graphs for numerical embodiment 1 as focused at infinity, and FIG. 4 is for the maximum wide-angle state (f=1.0000), FIG. 5 is for the first mid-focal length state (f=3.0054), FIG. 6 is for the second mid-focal length state (f=7.2467), and FIG. 7 is for the maximum telephoto state (f=14.0983).

In the various aberration graphs in FIGS. 4 through 7, the solid line in the spherical aberration graphs indicates spherical aberration, the solid line in the astigmatism graphs indicates the sagittal image plane while the broken line indicates the meridional image plane. In the transverse aberration graphs, A represents the angle of field, while y indicates the image height.

Figure 8:
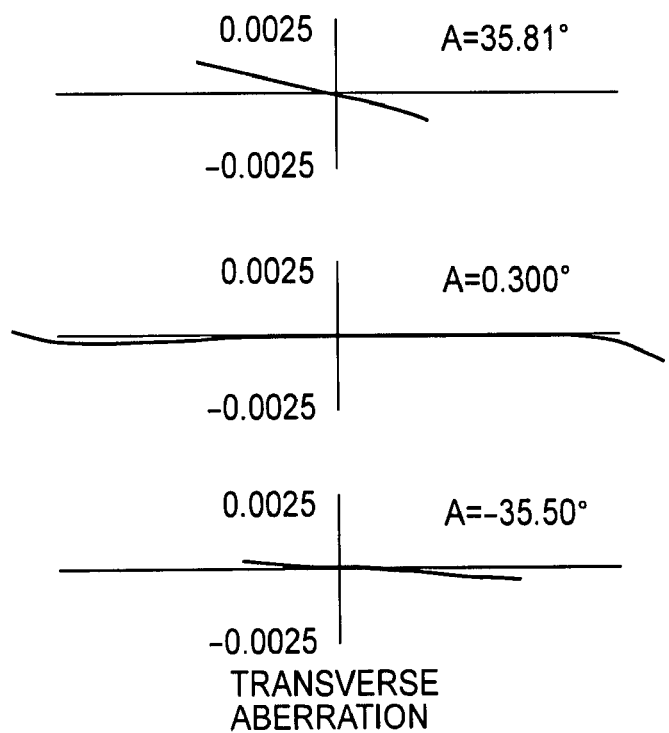
FIG. 8, along with FIGS. 9 through 11, indicates a transverse aberration graph for a case where the image side surface of the positive lens in the fifth lens group is tilted by 0.3 degrees in a state that is focused at infinity, and is presented with respect to a maximum wide-angle state.
Figure 9:
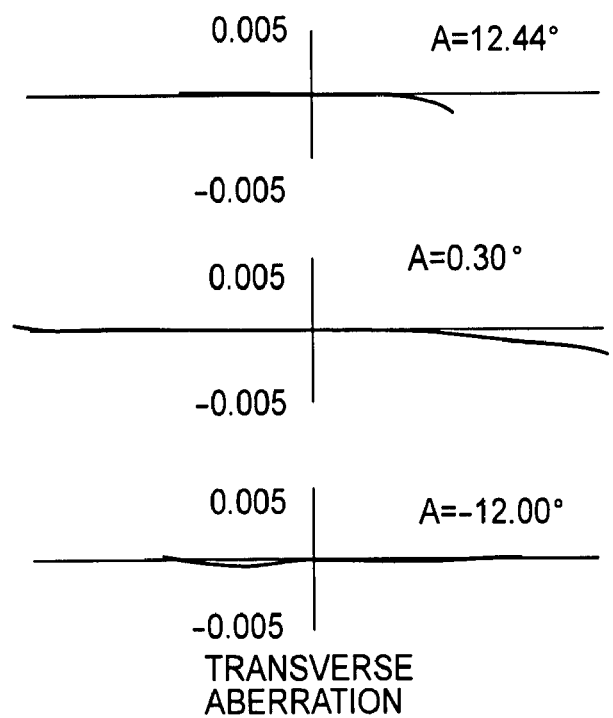
FIG. 9 indicates a transverse aberration graph with respect to a first mid-focal length state.
Figure 10:
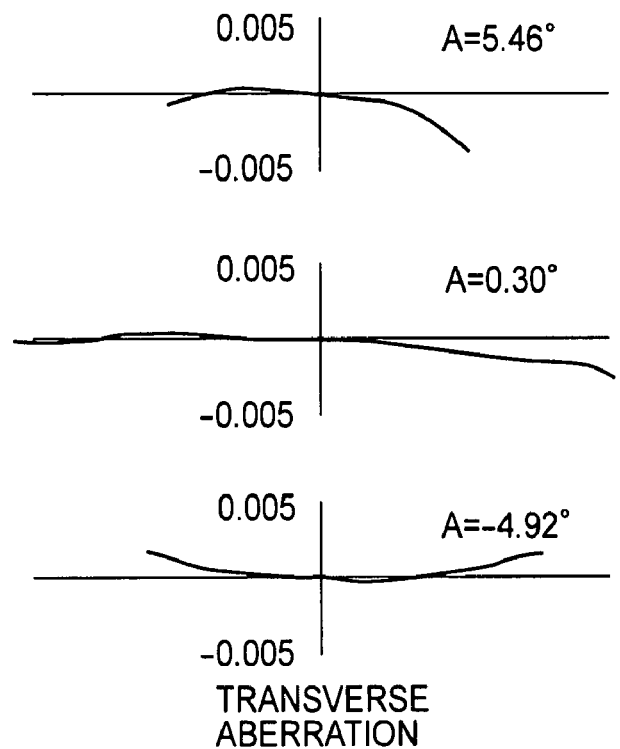
FIG. 10 indicates a transverse aberration graph with respect to a second mid-focal length state.
Figure 11:
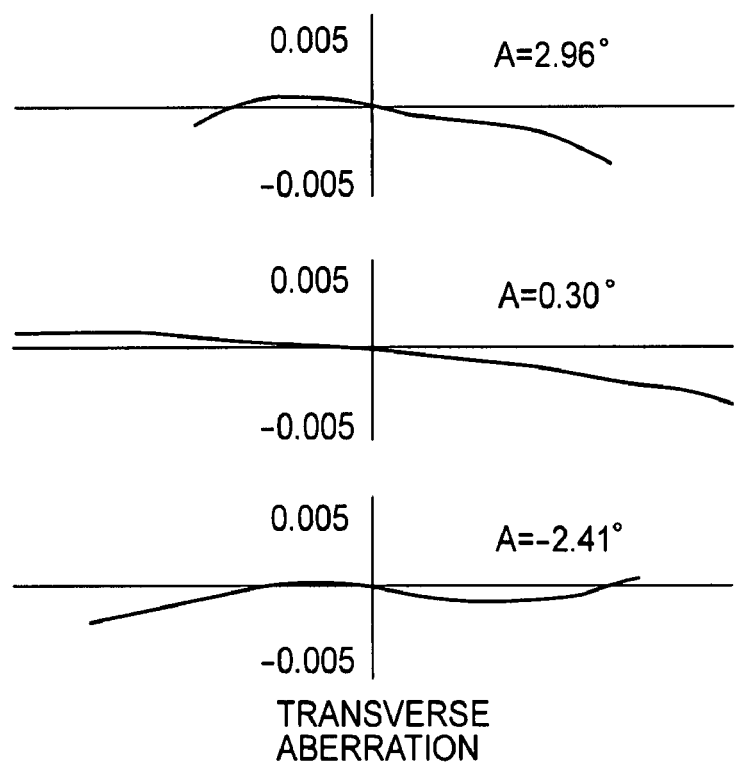
FIG. 11 indicates a transverse aberration graph with respect to a maximum telephoto state.

FIGS. 8 through 11 show transverse aberration graphs with respect to numerical embodiment 1 as focused at infinity in a case where the image side surface of the positive lens L52 within the fifth lens group G5 (the twenty-second surface) is tilted by 0.3 degrees, and FIG. 8 is for the maximum wide-angle state (f=1.0000), FIG. 9 is for the first mid-focal length state (f=3.0054), FIG. 10 is for the second mid-focal length state (f=7.2467), and FIG. 11 is for the maximum telephoto state (f=14.0983)

From the various aberration graphs, it can be seen that various aberrations are well corrected for in numerical embodiment 1, and that the imaging performance is superior.

Figure 12:
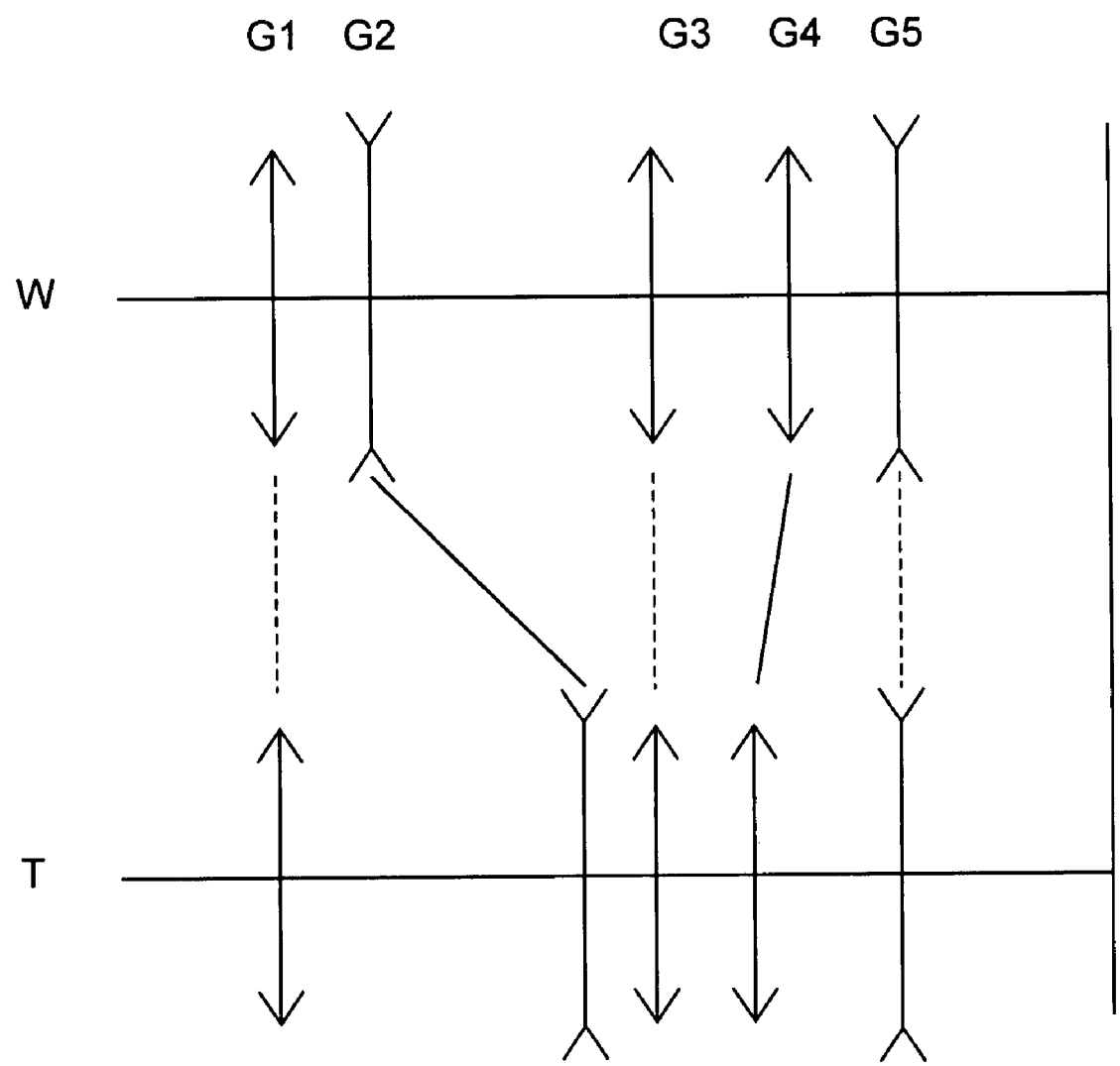
FIG. 12, along with FIGS. 13 through 19, indicates another embodiment of a zoom lens of the present invention, and is a diagram that indicates the distribution of refractive power as well as whether or not each of the lens groups is movable during zooming.

FIG. 12 indicates the distribution of refractive power of a zoom lens related to a second embodiment of the present invention. From the object side and in order, there are provided a first lens group G1 having a positive refractive power, a second lens group G2 having a negative refractive power, a third lens group G3 having a positive refractive power, a fourth lens group G4 having a positive refractive power, and a fifth lens group G5 having a negative refractive power. In zooming from the maximum wide-angle state to the maximum telephoto state, the second lens group G2 moves towards the image in such a manner that the air gap between the first lens group G1 and the second lens group G2 becomes larger, while the air gap between the second lens group G2 and the third lens group G3 becomes smaller. Here, the first lens group G1, the third lens group G3 and fifth lens group G5 are stationary, and the fourth lens group G4 corrects for changes in the image plane position accompanying the movement of the second lens group G2, and also moves towards the object during close range focusing.

Figure 13:
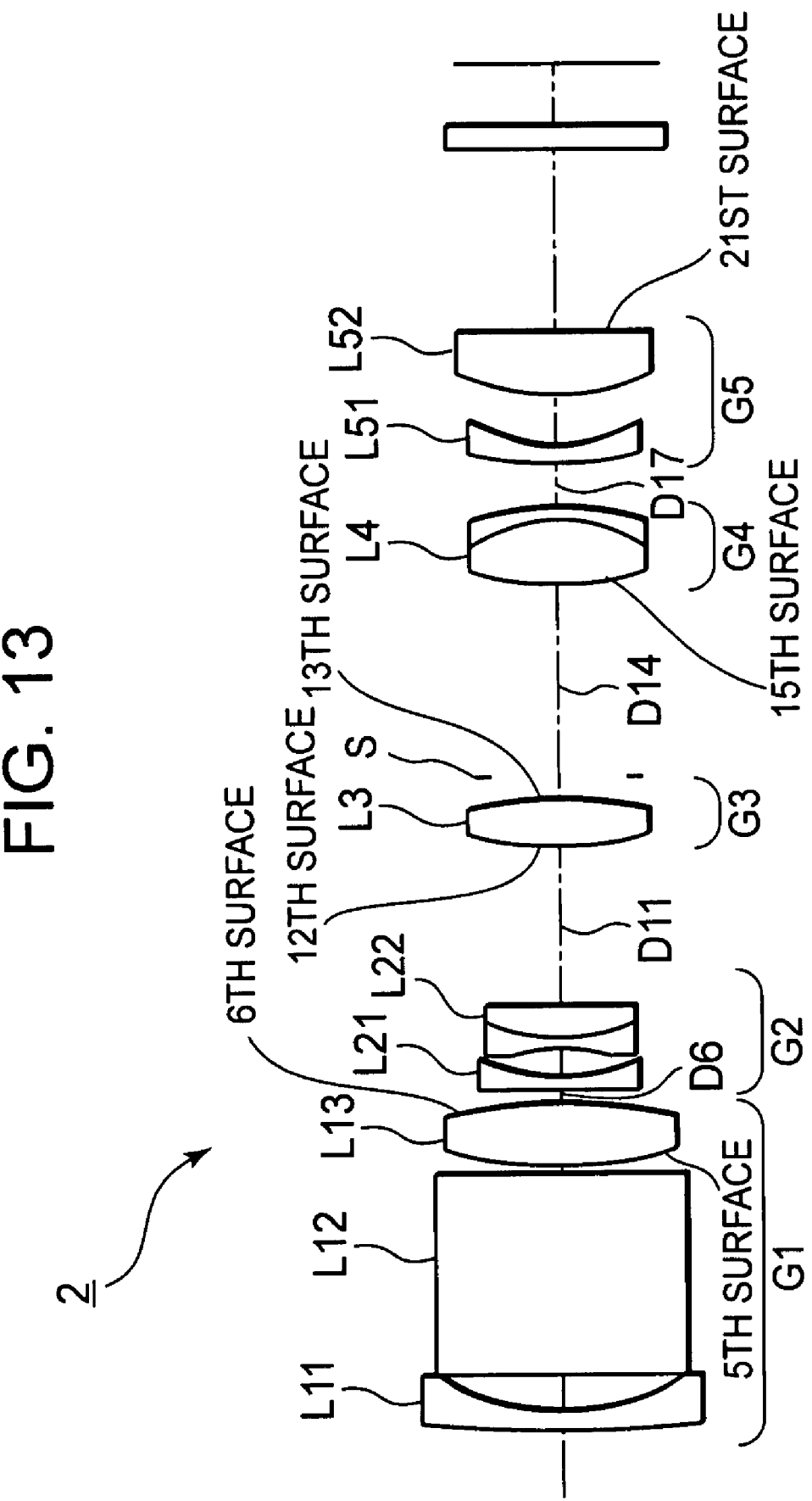
FIG. 13 is a diagram indicating a lens configuration.

FIG. 13 indicates the lens configuration of a zoom lens 2 related to the second embodiment of the present invention, and each lens group is configured in the manner described below.

The first lens group G1 includes, in order and from the side of the object, a negative lens L11 of a meniscus shape and whose convex surface is turned towards the object, a prism L12 and a positive lens L13 of a bi-convex shape both of whose surfaces are aspherical. The second lens group G2 includes, in order and from the side of the object, a negative lens L21 of a meniscus shape whose concave surface is turned towards the image, a cemented negative lens L22, which is of a bi-concave negative lens and a positive lens of a meniscus shape and whose convex surface is turned towards the object. The third lens group G3 includes a bi-convex positive lens L3 both of whose surfaces are aspherical. The fourth lens group G4 includes, in order and from the side of the object, a cemented positive lens L4, which is of a bi-convex positive lens whose object side surface is an aspheric surface and a negative lens of a meniscus shape whose concave surface is turned towards the object. The fifth lens group G5 includes, in order and from the side of the object, a negative lens L51 of a meniscus shape whose concave surface is turned towards the image and a positive lens L52 whose image side lens surface is a flat surface.

In this zoom lens 2, the first through fourth lens groups G1~G4 form the front group, and the fifth lens group G5 forms the rear group. By rotationally driving the positive lens L52 about the spherical center of its object side lens surface, it is possible to shift the image. In addition, an aperture stop S is positioned between the third lens group G3 and the fourth lens group G4. Therefore, there exists at least one movable lens group on both the front and rear sides of the aperture stop S (G2 on the front side, and G4 on the rear side).

Data values for numerical embodiment 2 in which specific numerical values are applied to the zoom lens 2 related to the second embodiment are indicated in Table 6.

TABLE 6 f 1.00~1.68~2.83
FNO 3.77~4.04~4.60
2ω 57.75~34.22~20.57°

| Surface No. | Radius of Curvature | Surface Gap | Refractive Index | Abbe No. | |
|---|---|---|---|---|---|
| 1: | 5.2491 | 0.092 | 1.92286 | 20.88 | |
| 2: | 1.2595 | 0.205 | | | |
| 3: | 0.0000 | 1.026 | 1.83481 | 42.72 | |
| 4: | 0.0000 | 0.044 | | | |
| 5: | 1.8659 | 0.323 | 1.76802 | 49.23 | |
| 6: | −2.3926 | (D6) | | | |
| 7: | 26.5389 | 0.073 | 1.88300 | 40.80 | |
| 8: | 1.0997 | 0.133 | | | |
| 9: | −1.5542 | 0.066 | 1.80420 | 46.50 | |
| 10: | 1.1627 | 0.147 | 1.92286 | 20.88 | |
| 11: | 6.7300 | (D11) | | | |
| 12: | 1.8578 | 0.223 | 1.76802 | 49.23 | |
| 13: | −3.7822 | 0.135 | | | Aperture |
| 14: | 0.0000 | (D14) | | | Stop |
| 15: | 1.6721 | 0.327 | 1.58313 | 59.456 | |
| 16: | −0.8270 | 0.073 | 1.90366 | 31.31 | |
| 17: | −1.5102 | (D17) | | | |
| 18: | 3.0791 | 0.073 | 1.84666 | 23.78 | |
| 19: | 0.8358 | 0.271 | | | |
| 20: | 1.3196 | 0.324 | 1.48749 | 70.44 | |
| 21: | 0.0000 | 0.950 | | | |
| 22: | 0.0000 | 0.126 | 1.51680 | 64.19 | |
| 23: | 0.0000 | (Bf) | | | |

Both surfaces of the final lens L13 of the first lens group G1 (the fifth and sixth surfaces), both surfaces of the positive lens L3 of the third lens group G3 (the twelfth and thirteenth surfaces), and the surface of the fourth lens group G4 that is closest to the object (the fifteenth surface) are aspheric surfaces. As such, the fourth-, sixth-, eighth- and tenth-order aspheric coefficients A, B, C and D, respectively, of these surfaces in numerical embodiment 2 are shown in Table 7.

TABLE 7

| | | | | |
|---|---|---|---|---|
| 5th Surface | κ = 0.000000 | A = −0.278342E−01 | B = +0.977047E−01 | C = −0.446409E+00 |
| | D = +0.633757E+00 | | | |
| 6th Surface | κ = 0.000000 | A = +0.116633E−01 | B = +0.108727E+00 | C = −0.509389E+00 |
| | D = +0.758994E+00 | | | |
| 12th Surface | κ = 0.000000 | A = −0.110120E−03 | B = −0.746140E+00 | C = +0.474398E+01 |
| | D = −0.105679E+02 | | | |
| 13th Surface | κ = 0.000000 | A = +0.708374E−01 | B = −0.794034E+00 | C = +0.505537E+01 |
| | D = −0.114476E+02 | | | |
| 15th Surface | κ = 0.000000 | A = −0.274041E−01 | B = −0.106751E+00 | C = +0.110198E+01 |
| | D = −0.236700E+01 | | | |

As the lens position state changes from the wide-angle end to the telephoto end, surface gap D6 between the first lens group G1 and the second lens group G2, surface gap D1 between the second lens group G2 and the third lens group G3, surface gap D14 between the third lens group G3 and the aperture stop S, surface gap D17 between the fourth lens group G4 and the fifth lens group G5 change. As such, values for each of the surface gaps D6, D11, D14 and D17 with respect to numerical embodiment 2 at the wide-angle end (f=1.0000), a mid-focal length (f=1.6793) and the telephoto end (f=2.8318) are shown in Table 8.

TABLE 8

| | f | | |
|---|---|---|---|
| | 1.0000 | 1.6793 | 2.8318 |
| D6 | 0.0767 | 0.5401 | 0.8798 |
| D11 | 0.8790 | 0.4156 | 0.0760 |
| D14 | 0.9999 | 0.6574 | 0.3029 |
| D17 | 0.2309 | 0.5734 | 0.9279 |
| Bf | 0.3176 | 0.3176 | 0.3176 |

With respect to numerical embodiment 2, the tilt angle ($\alpha$) of the final surface (the image side surface of the positive lens L52 within the fifth lens group G5 (the twenty-first surface)) that is required in order to correct for image blurring caused by an axial inclination of 0.5 degrees ($\theta$=0.5) at the wide-angle end (f=1.0000), the mid-focal length (f=1.6793), and the telephoto end (f=2.8318) are shown in Table 9.

TABLE 9

| | f | | |
|---|---|---|---|
| | 1.0000 | 1.6793 | 2.8318 |
| Surface of Emergence | $0.759^{DEG.}$ | $1.275^{DEG.}$ | $2.150^{DEG.}$ |

With respect to numerical embodiment 2, the focal length fp of the positive lens L52 within the fifth lens group G5 as well as the corresponding values for conditional Equations (1) through (5) are shown in Table 10.

TABLE 10

| fp = 2.707 |
|---|
| (1) fp/Bf = 2.004 |
| (2) Bf · FN0/Ymax= 11.764 |
| (3) Ymax/Rn = 0.400 |
| (4) Ds/TL = 0.519 |
| (5) vdn = 70.4 |

Figure 14:
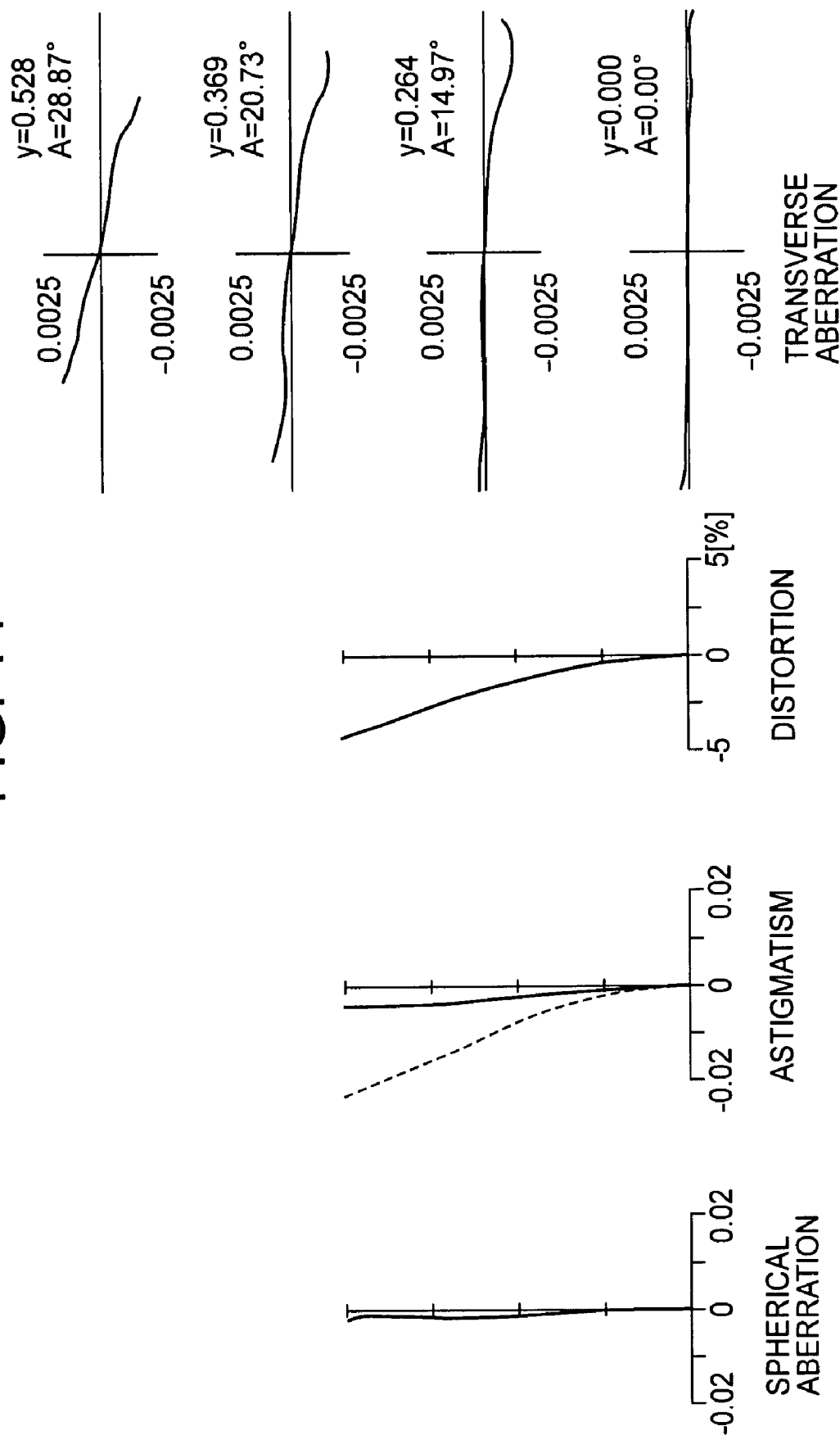
FIG. 14, along with FIGS. 15 and 16, shows various aberration graphs with respect to a numerical embodiment in which specific values are applied to an embodiment of the present invention focused at infinity, and the graphs in FIG. 14 illustrate the spherical aberration, astigmatism, distortion and transverse aberration in a maximum wide-angle state.
Figure 15:
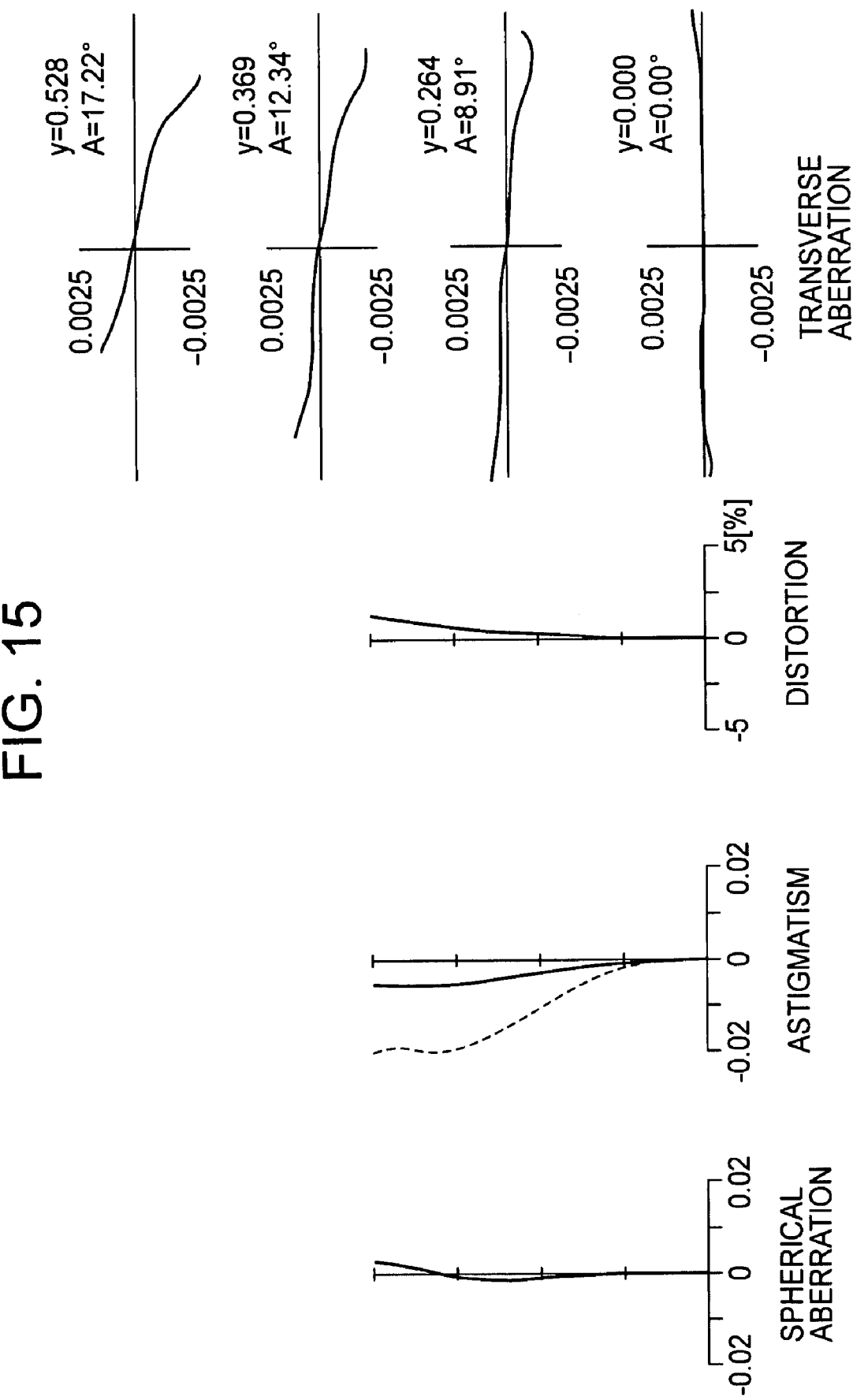
FIG. 15 illustrates the spherical aberration, astigmatism, distortion and transverse aberration in a mid-focal length state.
Figure 16:
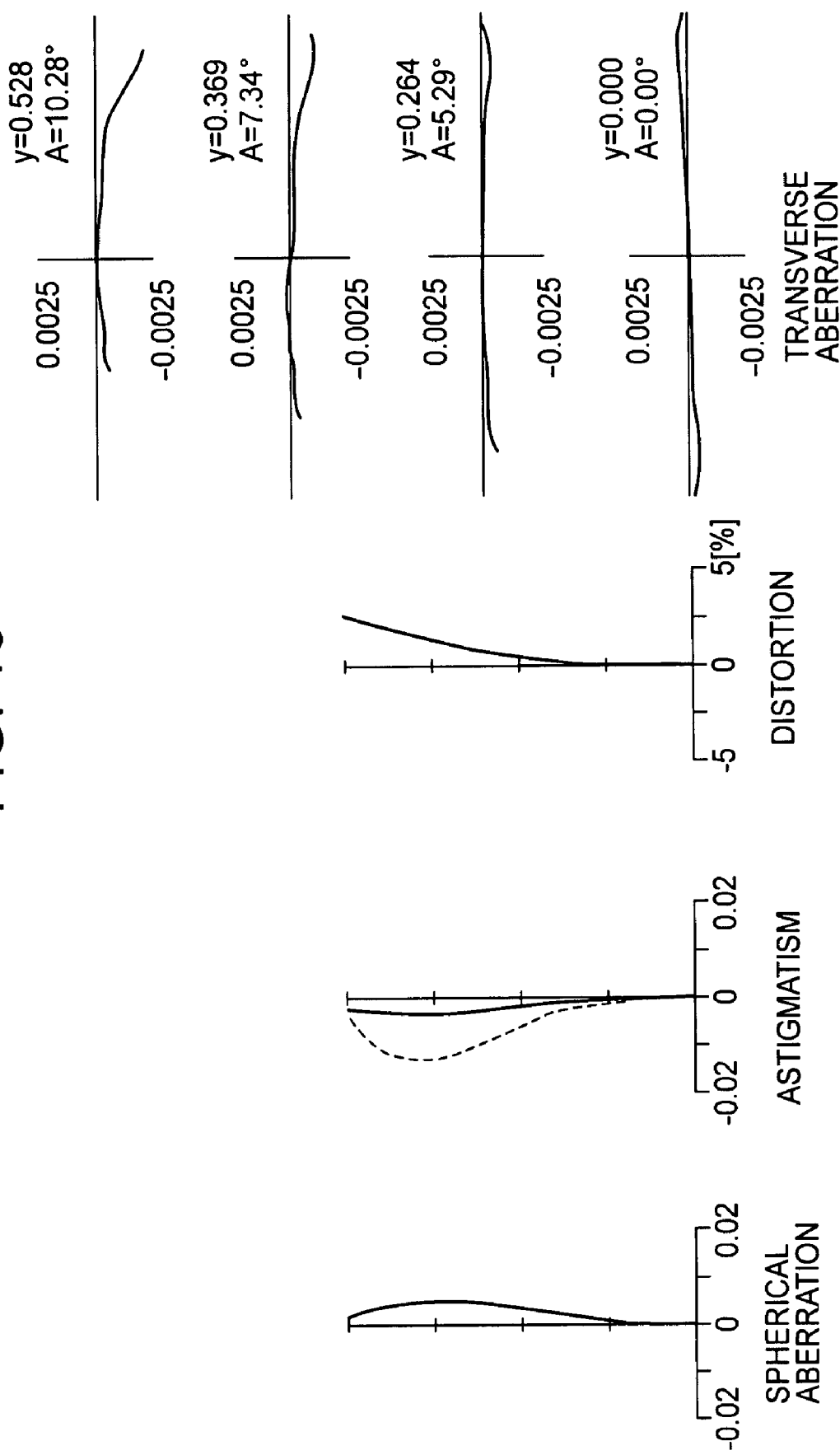
FIG. 16 illustrates the spherical aberration, astigmatism, distortion and transverse aberration in a maximum telephoto state.

FIGS. 14 through 16 show various aberration graphs for numerical embodiment 2 as focused at infinity, and FIG. 14 is for the maximum wide-angle state (f=1.0000), FIG. 15 is for the mid-focal length state (f=1.6793), and FIG. 16 is for the maximum telephoto state (f=2.8318).

In the various aberration graphs in FIGS. 14 through 16, the solid line in the spherical aberration graphs indicates spherical aberration, the solid line in the astigmatism graphs indicates the sagittal image plane while the broken line indicates the meridional image plane. In the transverse aberration graphs, A represents the angle of field, while y indicates the image height.

Figure 17:
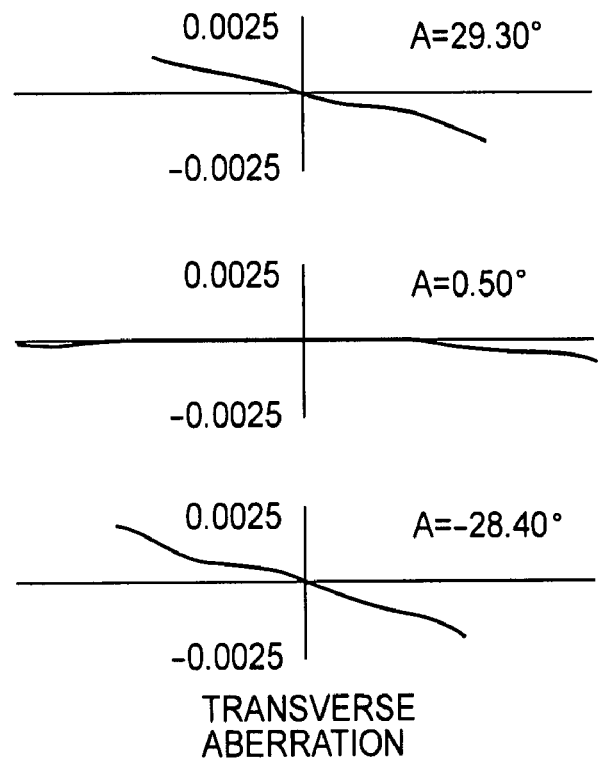
FIG. 17, along with FIGS. 18 and 19, indicates a transverse aberration graph for a case where the image side surface of the positive lens in the fifth lens group is tilted by 0.5 degrees in a state that is focused at infinity, and is presented with respect to a maximum wide-angle state.
Figure 18:
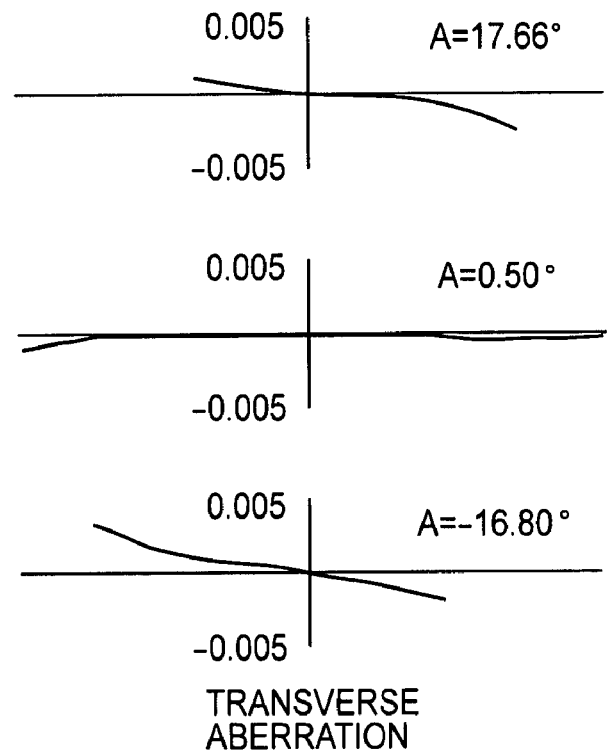
FIG. 18 indicates a transverse aberration graph with respect to a mid-focal length state.
Figure 19:
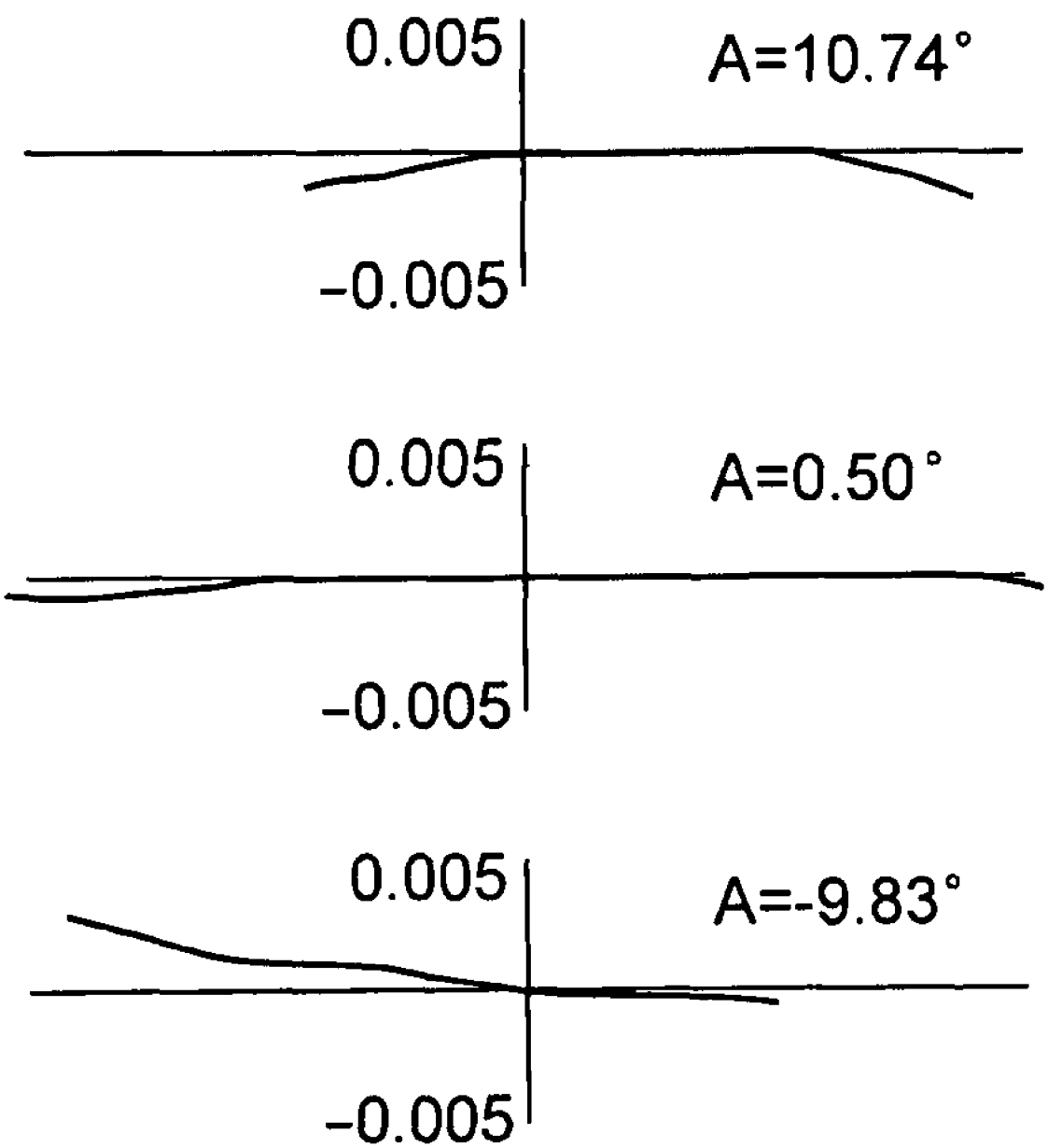
FIG. 19 indicates a transverse aberration graph with respect to a maximum telephoto state.

FIGS. 17 through 19 show transverse aberration graphs with respect to numerical embodiment 2 as focused at infinity in a case where the image side surface of the positive lens L52 within the fifth lens group G5 (the twenty-first surface) is tilted by 0.5 degrees, and FIG. 17 is for the maximum wide-angle state (f=1.0000), FIG. 18 is for the mid-focal length state (f=1.6793), and FIG. 19 is for the maximum telephoto state (f=2.8318)

From the various aberration graphs, it can be seen that various aberrations are well corrected for in numerical embodiment 2, and that the imaging performance is superior.

Next, an imaging apparatus according to an embodiment of the present invention is described.

An imaging apparatus of the present embodiment may include a zoom lens, an imaging device that converts the optical image formed by the zoom lens into electrical signals, a movement detection section that detects the axial inclination of the zoom lens, a computing section that computes the amount of correction based on the detection by the movement detection section, and a movement correction drive section that performs a movement correction operation in accordance with the correction amount computed by the computing section. The above-mentioned zoom lens may include a front group that includes a plurality of movable lens groups, and a rear group that is located on the image side of the front group and that includes a negative lens and a positive lens. The image side lens surface of the positive lens is flat, and the positive lens may be tilted about the spherical center of its object side lens surface, which is a convex surface. When the lens system is inclined due to some sudden impact, the positive lens is tilted by angle $\alpha$ in relation to the optical axis of the lens system based on Equation (0) shown below:

$$\alpha = -f \cdot \theta / [Bf(n-1)] \quad (0)$$

The above-mentioned movement detection section detects the $\theta$, the computing section computes $\alpha x$ based on the Equation (0), and the movement correction drive section tilts the positive lens by $\alpha$.

Figure 20:
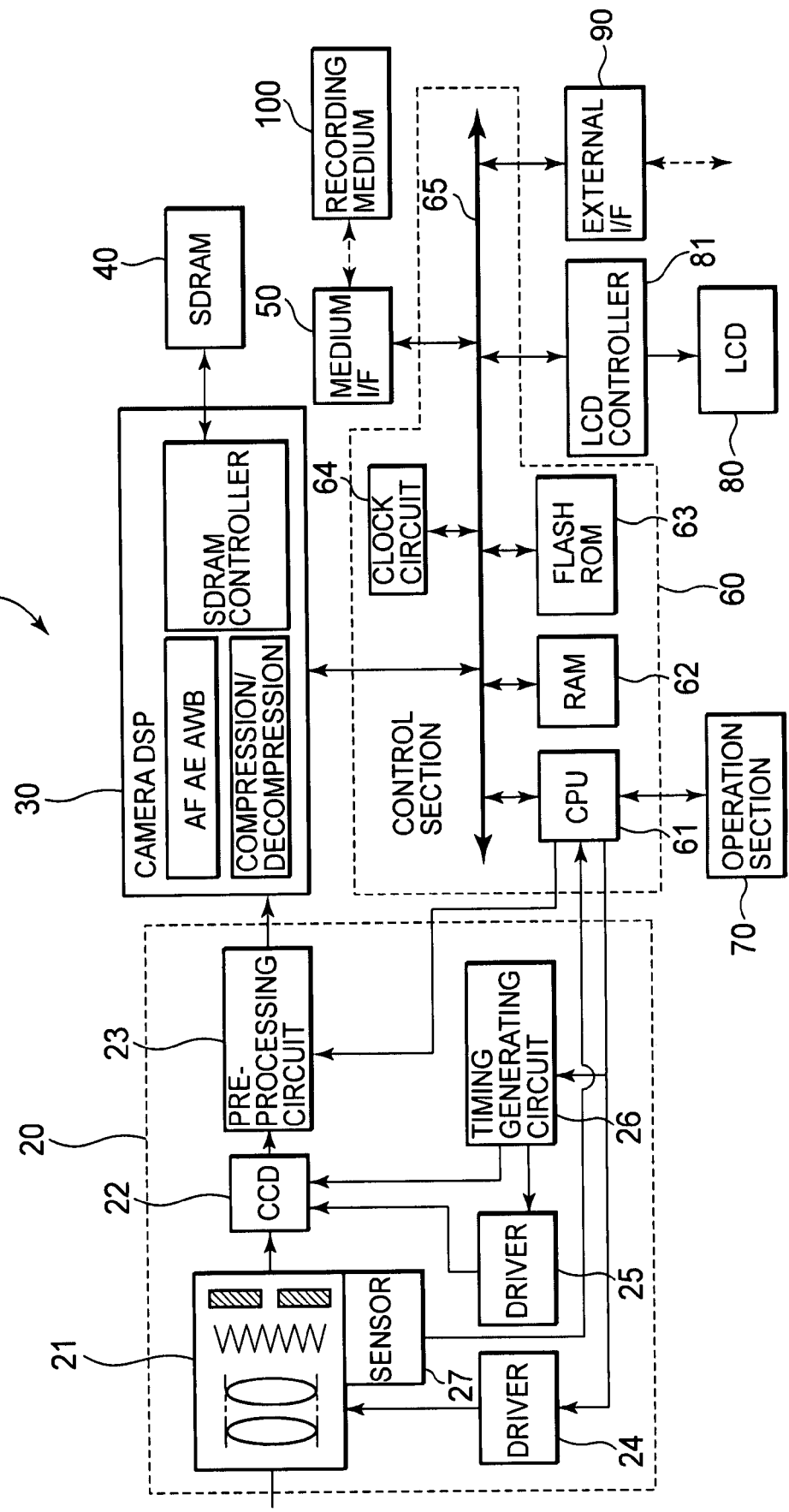
FIG. 20 is a block diagram indicating an example of an embodiment of an imaging apparatus of the present invention.

A block diagram of an imaging apparatus according to an embodiment of the present invention is shown in FIG. 20.

As shown in FIG. 20, an imaging apparatus 10 related to this embodiment is, among other things, equipped with a camera section 20, a camera DSP (Digital Signal Processor) 30, an SDRAM (Synchronous Dynamic Random Access Memory) 40, a medium interface (medium I/F) 50, a control section 60, an operation section 70, an LCD (Liquid Crystal Display) 80, and an external interface (external I/F) 90, and a removable recording medium 100 may be provided.

Various kinds of recording media may be used for the recording medium 100 such as a memory card employing a semiconductor memory, an optical recording medium, such as a recordable DVD (Digital Versatile Disk), a recordable CD (Compact Disc) and the like, a magnetic disk and the like. However, in this embodiment, a description is given where a memory card, for example, is used as the recording medium 100.

The camera section 20 may include an optical block 21, a CCD (Charge Coupled Device) 22, a pre-processing circuit 23, an optical driver 24, a CCD driver 25, a timing generating circuit 26, a movement detection section 27, and the like. Here, the optical block 21 may include a lens, a focus mechanism, a shutter mechanism, an aperture (iris) mechanism, a movement correction drive section and the like. In addition, for the lens within the optical block 21, a zoom lens related to the present invention, such as the zoom lenses 1 and 2, and the like, is used.

In addition, the control section 60 is a micro-computer in which a CPU (Central Processing Unit) 61, a RAM (Random Access Memory) 62, a flash ROM (Read Only Memory) 63, a clock circuit 64 and the like are interconnected via a system bus 65, and is capable of controlling the various sections in the imaging apparatus 10 of this embodiment.

Here, the RAM 62 is used chiefly as a work area for temporarily storing intermediate processing results. In addition, the flash ROM 63 stores various programs that are executed by the CPU 61, data that are necessary for processing, and the like. In addition, the clock circuit 64 is capable of providing the current date, current day, and current time, while also being capable of providing the time and date of image-capturing and the like.

In capturing an image, the optical block driver 24 generates a drive signal that makes the optical block 21 operate under the control of the control section 60, supplies the drive signal to the optical block 21, and thus makes the optical block 21 operate. In accordance with the drive signal from the optical block driver 24, the optical block 21 controls the focus mechanism, the shutter mechanism, the aperture mechanism, and the movement correction drive section to take in the image of the subject, and supplies it to the CCD 22.

The CCD 22 performs photoelectric conversion on the image from the optical block 21, operates in accordance with a drive signal from the CCD driver 25, takes in the image of the subject from the optical block 21, and, based on a timing signal from the timing generating circuit 26 that is controlled by the control section 60, supplies to the pre-processing circuit 23 as electric signals the image (or image information) of the subject that is taken in.

It is noted that, as described above, the timing generating circuit 26 generates a timing signal that provides a predetermined timing under the control of the control section 60. In addition, based on the timing signal from the timing generating circuit 26, the CCD driver 25 generates a drive signal that is to be supplied to the CCD 22.

With respect to the image information of the supplied electric signals, the pre-processing circuit 23 performs CDS (Correlated Double Sampling) processing to keep the S/N ratio under control, while performing AGC (Automatic Gain Control) processing to control gain, and also performs A/D (Analog/Digital) conversion to generate image data that is made digital.

The image data from the pre-processing circuit 23 that is made digital is supplied to the camera DSP 30. With respect to the image data supplied thereto, the camera DSP 30 performs such camera signal processing as AF (Auto Focus), AE (Auto Exposure), AWB (Auto White Balance) and the like. The image data, to which various kinds of adjustments are made as described above, is compressed through a predetermined compression method, supplied via the system bus 65 and the medium I/F 50 to the recording medium 100 that is loaded in the imaging apparatus 10 of this embodiment, and recorded as a file on the recording medium 100 as described below.

In addition, in accordance with an operational input from the user that is accepted via the operation section 70, which may include a touch panel, control keys and the like, the desired image data among the image data recorded on the recording medium 100 is read from the recording medium 100 via the medium I/F 50, and is supplied to the camera DSP 30.

With respect to the compressed image data that is read from the recording medium 100 and supplied via the medium I/F 50, the camera DSP 30 performs a decompression process (expansion process) for the compressed data, and supplies the decompressed image data to an LCD controller 81 via the system bus 65. From the image data supplied thereto, the LCD controller 81 generates image signals to be supplied to the LCD 80, and supplies them to the LCD 80. Thus, an image corresponding to the image data recorded on the recording medium 100 is displayed on the display screen of the LCD 80.

It is noted that the mode for displaying an image follows a display processing program that is recorded in the ROM. In other words, this display processing program is a program that specifies how a file system, which will be described later, is recorded, and how images are to be reproduced.

In addition, the imaging apparatus 10 related to this embodiment is equipped with the external I/F 90. The imaging apparatus 10 may be connected with an external personal computer, for example, via this external I/F 90, be supplied with image data from the personal computer, and record it on the recording medium 100 that is loaded in the imaging apparatus 10, or the imaging apparatus 10 may supply image data that is recorded on the imaging apparatus 100 loaded thereinto and supply it to an external personal computer and the like.

In addition, by connecting a communications module with the external I/F 90, the imaging apparatus 10 may be connected to, for example, a network, such as the Internet, obtain various image data and other information via this network, and record it on the recording medium 100 that is loaded in the imaging apparatus 10, or the imaging apparatus 10 may transmit data recorded on the recording medium 100 loaded in the imaging apparatus 10 to the desired destination via the network.

In addition, with respect to such information as image information that is obtained via an external personal computer or a network and recorded on the recording medium 100, the imaging apparatus 10 of the present embodiment is naturally capable of reading, playing and displaying it on the LCD 80.

It is noted that the external I/F 90 may be provided as a wired interface such as IEEE (Institute of Electrical and Electronics Engineers) 1394, USB (Universal Serial Bus) and the like, or it may be provided as an optical wireless interface or a wireless interface using radio waves. In other words, the external I/F 90 may be either of a wired or wireless interface.

As described above, the imaging apparatus 10 related to the present embodiment is capable of capturing an image of a subject, and recording it on the recording medium 100 that is loaded in the imaging apparatus 10, and is also capable of reading, reproducing and using image data that is recorded on the recording medium 100. In addition, the imaging apparatus 10 may receive image data via an external personal computer or network and record it on the recording medium 100 that is loaded in the imaging apparatus 10 or read and reproduce the image data.

Further, this imaging apparatus 10 has a so-called image stabilization function. In other words, when an axial inclination of the zoom lens momentarily occurs while the shutter is open due to the pressing of a release button (which is not shown in the drawings), and a movement of the image on the light receiving surface of the CCD 22 occurs as a result, image shifting is performed by tilting the image side surface of the positive lens within the fifth lens group, and the imaging apparatus 10 is thus equipped with a function where it is able to obtain an image that is as if no axial inclination of the zoom lens had occurred.

Figure 21:
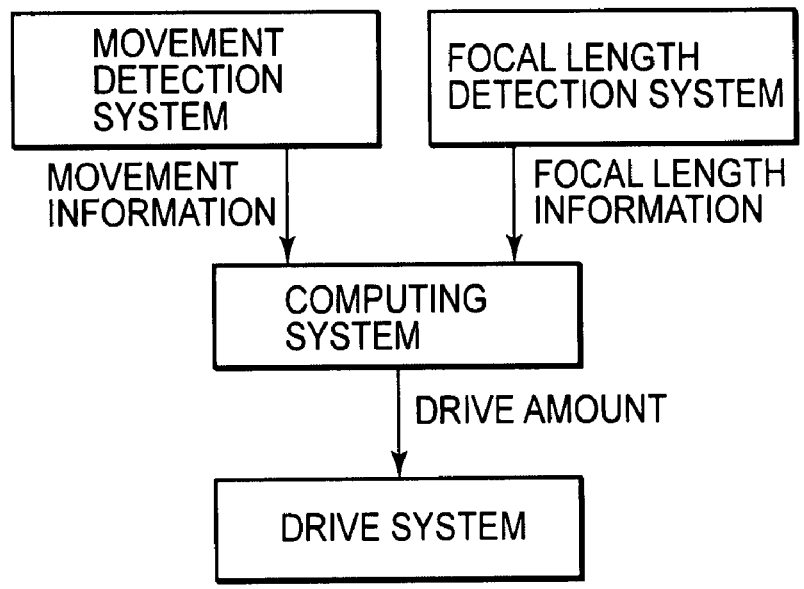
FIG. 21 is a block diagram indicating an example of an image stabilization function.
Figure 22:
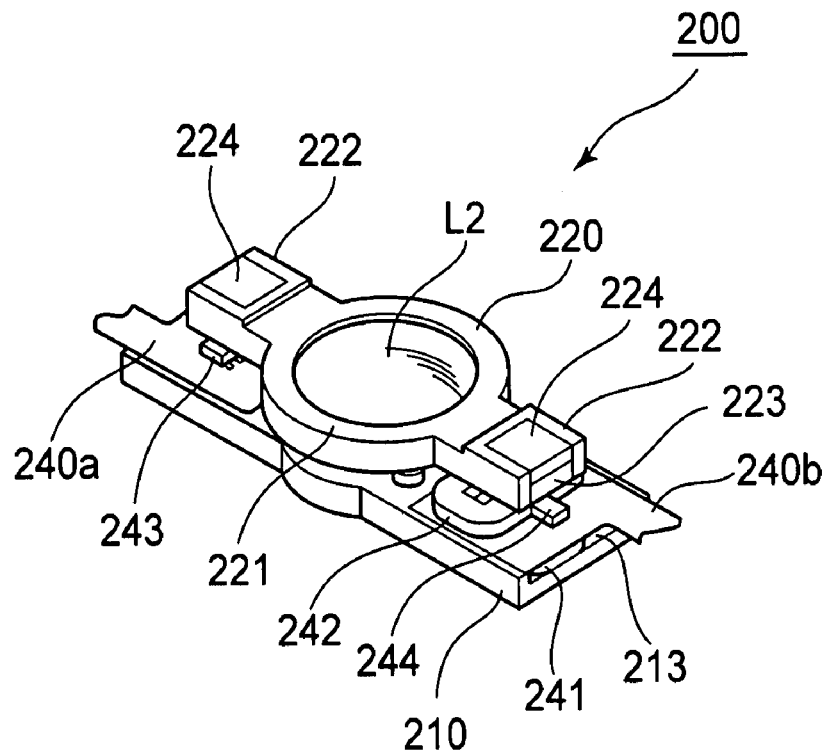
FIG. 22, along with FIGS. 23 through 25, indicates an example of a movement correction driving section, and is a perspective view as viewed from behind.
Figure 25:
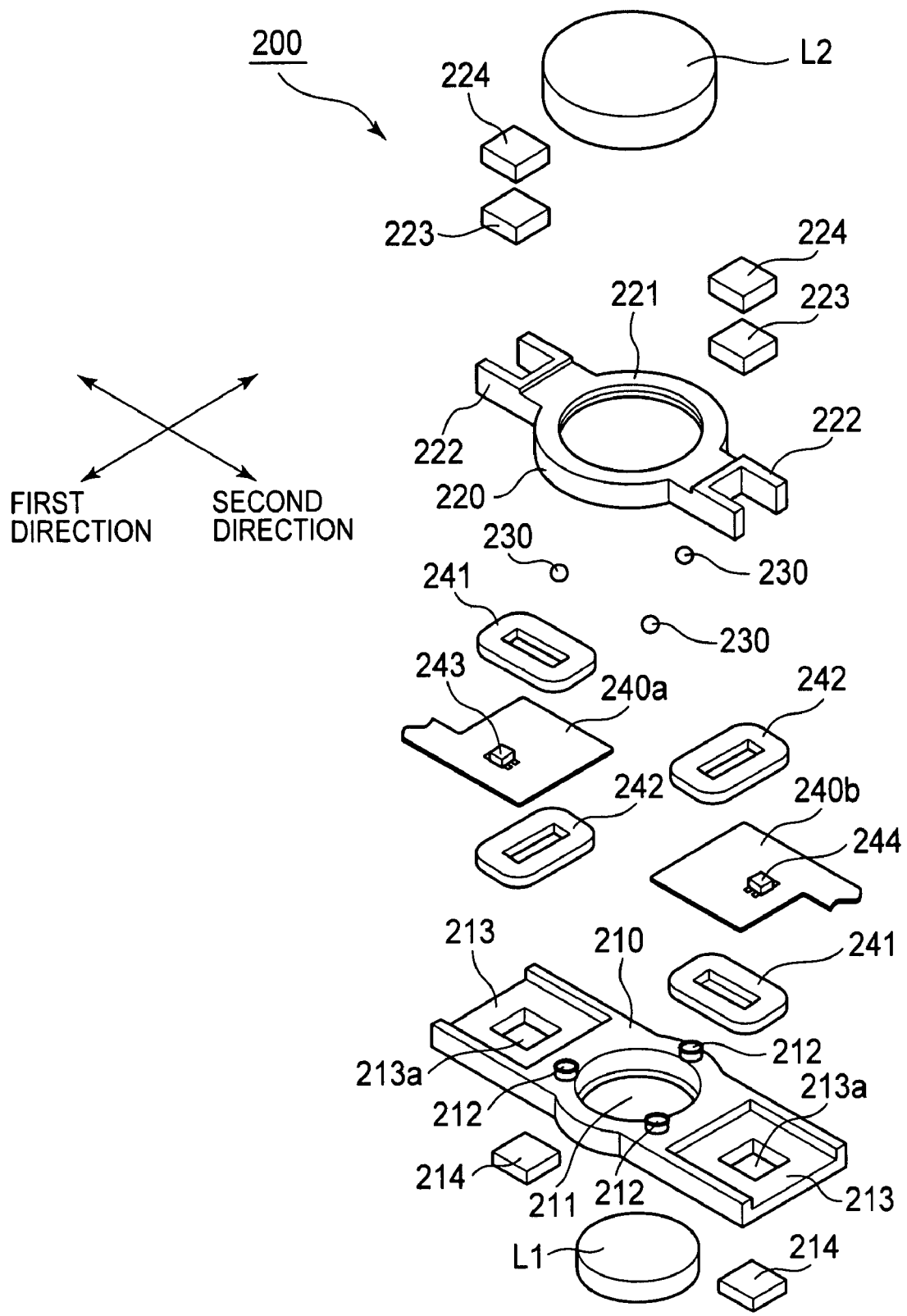
FIG. 25 is an exploded perspective view.

An example of the image stabilization function of the imaging apparatus 10 of the present embodiment is shown in the block diagram in FIG. 21.

When an inadvertent hand movement, in other words the axial inclination of the zoom lens, occurs, the correction amount that is necessary in order to correct for the hand movement is computed by a computing system based on movement information that is outputted from a movement detection system, in other words the movement detection section 27, focal length information that is outputted from a focal length detection system, and coefficients that are prestored in the computing system. The correction amount is provided to a drive system as correction information, and a tilt amount is provided to the positive lens (the corrective lens) in the fifth lens group by the drive system.

An angular rate sensor, for example, may be used for the movement detection section 27, which is the movement detection system, and the angular rates in two opposing directions are independently detected. The focal length detection system outputs information that can be converted into focal length based on a lens drive amount from a reference position, or on a movement amount that can be converted into the lens drive amount (for example, cam rotation angle to be specific).

The CPU 61 performs the role of the computing system, and obtains the axial inclination amount of the zoom lens from the movement detection section 27 as well as the focal length information, references a table that is pre-generated through calculations based on the Equation (0), $\alpha = -f \cdot \theta / [Bf(n-1)]$ and that is stored in a memory within the CPU 61 or in the flash ROM 63, computes the tilt angle $\alpha$ for the image side surface (the emergent surface) of the corrective lens that is necessary for correcting for image blurring, and drives via the driver 24 the movement correction drive section within the camera block 21 based on this computation result, and thus tilts the corrective lens.

Various configurations are applicable for the movement correction drive section that tilts the corrective lens, and an example thereof is indicated in FIGS. 22 through 25.

A movement correction drive section 200 may include a fixing base 210, and a moveable frame 220 is tiltably attached to the fixing base 210. There is formed a circular lens attachment hole 211 in the center portion of the fixing base 210, and a lens L1 is attached to this lens attachment hole 211. On the rear side of the fixing base 210 and at positions that encircle the lens attachment hole 211, three ball placement recessed sections 212 are formed at equal intervals in approximately the circumferential direction. To the left and right of the lens attachment hole 211 on the rear side of the fixing base 210 are formed placement recessed sections 213, and a fixing hole 213a is formed in roughly the center portion of each of the placement recessed sections 213. And an opposing yoke 214 is engaged and fixed with each fixing hole 213a in the placement recessed sections 213.

The movable frame 220 includes a lens holding section 221 that is roughly in the shape of a ring, and two holding sections 222, one each on the left and right sides and protruding therefrom, which have a C-like shape when viewed from the front and rear directions and which are outwardly open ended. These parts are integrated into one. A lens L2 is attached to the lens holding section 221, and a magnet 223 is fixed to each of the holding sections 222. In addition, a back yoke is fixed to the rear side of each of the magnets 223.

Then the movable frame 220 is placed over the rear side of the fixing base 210. Here, the center of the lens attachment hole 211 of the fixing base 210 and the center of the lens holding section 221 of the movable frame 220 are placed in alignment with each other. In other words, the axes of a lens L1 and the lens L2 that are held thereby, respectively, are made to align. It is noted that the lens L1 is the negative lens L51 of the fifth lens group G5 in the zoom lenses 1 and 2, and the convex surface of the positive lens L2 is made to face the negative lens L1. The lens L2 is the positive lens L52 of the fifth lens group G5, and balls 230 are rollably provided in the ball placement recessed sections 212 of the fixing base 210.

Thus, by the magnetic circuit that is formed between the magnets 223, the back yokes 224, and the opposing yokes 214, the movable frame 220 is sucked towards the fixing base 210, in other words in the direction of the optical axis, and the peripheral portion of the convex surface of the lens L2 comes into contact with the balls 230 (see FIG. 24). As a result, the lens L2 is positioned in the direction of the optical axis. Then, when the movable frame 220 moves in a first and/or second direction(s) with respect to the fixing base 210 (see FIGS. 23 and 25), the balls 230 roll over the convex surface of the lens L2, and the lens L2 thus moves along with the moving frame 220 in a tilting manner in relation to the fixing base 210.

Then coil substrates 240 are provided in the placement recessed sections 213 of the fixing base 210. First direction coils 241 and second direction coils 242, and hall elements 243 and 244 are mounted on the coil substrates 240. The first direction coil 241 is provided on the rear side and towards the upper side of the left side coil substrate 240a in such a manner that it extends across, and the first direction hall element 243 is provided in such a manner that it is in contact with the lower side of this first direction coil 241. The second direction coil 242 is provided on the front side of the coil substrate 240a in such a manner that it extends vertically, and in a state where it is positioned towards the lens attachment hole 211 (see FIG. 23 for the positional relationship between each element). The second direction coil 242 is provided on the rear side and towards the left side of right side coil substrate 240b, in other words towards the lens attachment hole 211, in such a manner that it extends vertically, and the second direction hall element 244 is provided in such a manner that it is in contact with the right side of the second direction coil 242. The first direction coil 241 is provided on the front side of the coil substrate 240b in such a manner that it extends across, and in a state where it is positioned towards the lower side.

The operation of the movement correction drive section 200 is described mainly with reference to FIG. 23. FIG. 23 is a diagram in which the fixing base 210 and components provided thereon are viewed from behind, and the first direction is defined as the up-down direction, and the second direction is defined as the left-right direction.

When a current flows through the first direction coil 241, a change in the magnetic field occurs, and depending on the direction of the current, a movement force in the upper or lower direction is generated with respect to the movable frame 220. Since the convex surface of the lens L2 held by the movable frame 220 is unable to move away from the balls 230 that are held by the fixing base 210 due to the magnetic suction force that is at work between the magnets 223 and the opposing yokes 214, the movable frame 220 ends up tilting in the upper or lower direction about the spherical center of the lens L2. In addition, when a current flows through the second direction coil 242, a change in the magnetic field occurs, and depending on the direction of the current, a movement force in the left or right direction is generated with respect to the movable frame 220, and the movable frame 220 thus ends up tilting in the left or right direction about the spherical center of the lens L2. The ratio for each tilting motion, in other words the tilt angle, corresponds to the value of the current that flows through each of the coils 241 and 242. In addition, when a current simultaneously flows through the coils 241 and 242, the movable frame 220 tilts in a composite direction in which the up-down and left-right directions are combined depending on the ratio between these currents. In other words, by appropriately allowing currents to flow through the two kinds of coils 241 and 242, it is possible to tilt the movable frame 220 in any direction. In addition, when the movable frame 220 is tilted, the lens L2 that is held thereby is also tilted. In addition, since the lens L2, in other words the corrective lens (the positive lens L52 of the fifth lens group G5), tilts about the spherical center of its object side lens surface, only the tilt angle of the image side lens surface of the corrective lens with respect to the optical axis, in other words a, changes.

As described above, the inclination of the optical axis of the zoom lens, in other words the θ, is given to the computing section 61 from the movement detection section 27 that detects movements of the camera that result from shutter release and the like, the correction amount, in other words a, that is necessary in order to correct for image blurring caused by the movements of the camera is calculated at the computing section 61, currents corresponding to this correction amount is allowed to flow through the first direction coil 241 and the second direction coil 242, and the final surface of the corrective lens is tilted by a as a result, thereby correcting for the image blurring.

It is noted that the movement amount of the movable frame 220 in the first direction is detected by the first hall element 243, and the movement amount of the movable frame 220 in the second direction is detected by the second hall element 244. By having the computing section 61 reference these movement amount information in calculating the correction amount, it is possible to realize an even higher-precision image stabilization control.

In addition, the movement correction drive section 200 shown in FIGS. 22 through 25 is merely an example of a movement correction drive section, and the movement correction drive section in an imaging apparatus of the present embodiment is by no means limited by the movement correction drive section 200.

Further, with respect to the imaging apparatus 10, a CCD is indicated as an imaging means, but this is not to be taken to mean that the imaging means in an imaging apparatus of the present embodiment is limited to a CCD. Besides a CCD, a CMOS (Complementary Metal-Oxide Semiconductor) and other imaging means may also be used.

In addition, the calculation method for the correction amount a is not limited to a method that references a correlation table of the axial inclination amount θ caused by hand movements and the like, the focal length f and α, and the correction amount a may instead be calculated per case by substituting the axial inclination amount θ detected by the detection system and the focal length f into the Equation (0), α=−f·θ/[Bf(n−1)].

In terms of specific products, the imaging apparatus 10 may assume various forms and modes. For example, it can be applied widely as the camera section and the like of digital input/output devices such as digital still cameras, digital video cameras, mobile phones into which a camera is incorporated, PDAs (Personal Digital Assistants) into which a camera is incorporated and the like.

The present application contains subject matter related to Japanese Patent Application JP 2006-166428 filed in the Japanese Patent Office on Jun. 15, 2006, the entire content of which being incorporated herein by reference.

It is noted that the specific forms and numerical values indicated in the embodiments and numerical embodiments are merely presented as examples for embodying the present invention, and the technical scope of the present invention should not in any way be limited thereto.

What is claimed is:

1. A zoom lens, comprising:
a front group including a plurality of movable lens groups; and
a rear group that is provided on an image side of the front group and that includes a negative lens and a positive lens, wherein
an image side lens surface of the positive lens is a flat surface,
the positive lens is tiltable about a spherical center of its object side lens surface which is convex on the object side,
when a lens system is inclined, the positive lens is tilted by angle α in relation to the optical axis of the lens system based on Equation (0) below:

$$\alpha = -f\theta/[Bf(n-1)] \quad (0)$$

where
α: an angle formed between a normal line of the image side lens surface of the positive lens provided within the rear group and the optical axis of the lens system;
f: a focal length of the overall lens system;
θ: an angle of the optical axis of the lens system after being inclined in relation to the optical axis before being inclined;
Bf: a distance between the image side lens surface of the positive lens provided within the rear group and the image plane; and
n: a refractive index of the positive lens provided within the rear group.

2. The zoom lens according to claim 1, wherein
the rear group is fixed in the direction of the optical axis regardless of the lens position state, and Equations (1) and (2) below are satisfied:

$$1 < fp/Bf < 3 \quad (1)$$

$$3 < Bf \cdot FNO/Y\text{max} \quad (2)$$

where
fp: a focal length of the positive lens provided within the rear group;
FNO: F number in a maximum telephoto state; and
Ymax: a maximum image height.

3. The zoom lens according to claim 2, further satisfying Equation (3) below:

$$0.2 < Y\text{max}/Rn < 0.7 \quad (3)$$

where
Rn: a radius of curvature of the object side lens surface of the positive lens provided within the rear group.

4. The zoom lens according to claim 3, further satisfying Equation (5) below:

$$vdn > 58 \quad (5)$$

where
vdn: Abbe number of the positive lens provided within the rear group with respect to the d-line (λ=587.6 nm).

5. The zoom lens according to claim 1, wherein
an aperture stop is provided within the front group;
the front group includes at least one movable lens group on both the object side and the image side of the aperture stop, respectively,
the focal length varies as the movable lens groups move, and Equation (4) below is satisfied:

$$0.4 < Ds/TL < 0.7 \quad (4)$$

where
Ds: a distance along the optical axis from the aperture stop to the image plane in a maximum wide-angle state; and
TL: a distance along the optical axis from a lens surface on the side of the zoom lens that is closest to the object to the image plane in the maximum wide-angle state.

6. An imaging apparatus, comprising:
a zoom lens;
an imaging device that converts an optical image formed by the zoom lens into electrical signals;
a movement detection section that detects an axial inclination of the zoom lens;
a computing section that computes a correction amount based on a detection by the movement detection section; and
a movement correction drive section that performs a movement correction operation in accordance with the correction amount computed by the computing section, wherein
the zoom lens includes a front group that includes a plurality of movable lens groups, and a rear group that is provided on the image side of the front group and that includes a negative lens and a positive lens,
an image side lens surface of the positive lens is a flat surface,
the positive lens is tiltable about the spherical center of its object side lens surface which is convex on the object side,
when a lens system is inclined, the positive lens is tilted by angle $\alpha$ in relation to the optical axis of the lens system based on Equation (0) below:

$$\alpha = -f\,\theta/[Bf(n-1)] \quad (0),$$

where
- $\alpha$: an angle formed between a normal line of the image side lens surface of the positive lens provided within the rear group and the optical axis of the lens system;
- $f$: a focal length of the overall lens system;
- $\theta$: an angle of the optical axis of the lens system after being inclined in relation to the optical axis before being inclined;
- $Bf$: a distance between the image side lens surface of the positive lens provided within the rear group and the image plane; and
- $n$: a refractive index of the positive lens provided within the rear group.

the movement detection section detects $\theta$, the computing section computes $\alpha$ based on Equation (0), and the movement correction drive section tilts the positive lens by $\alpha$.

* * * * *